United States Patent
Christ

(10) Patent No.: US 9,262,403 B2
(45) Date of Patent: *Feb. 16, 2016

(54) DYNAMIC GENERATION OF AUTO-SUGGEST DICTIONARY FOR NATURAL LANGUAGE TRANSLATION

(75) Inventor: Oliver Christ, Ipswich, MA (US)

(73) Assignee: SDL PLC, Maidenhead (GB)

( * ) Notice: Subject to any disclaimer, the term of this patent is extended or adjusted under 35 U.S.C. 154(b) by 454 days.

This patent is subject to a terminal disclaimer.

(21) Appl. No.: 13/007,445

(22) Filed: Jan. 14, 2011

(65) Prior Publication Data

US 2011/0184719 A1    Jul. 28, 2011

Related U.S. Application Data

(63) Continuation-in-part of application No. 12/636,970, filed on Dec. 14, 2009, now Pat. No. 8,935,148.

(30) Foreign Application Priority Data

Mar. 2, 2009 (GB) .................................. 0903418.2

(51) Int. Cl.
*G06F 17/28* (2006.01)
*G06F 17/27* (2006.01)

(52) U.S. Cl.
CPC .............. *G06F 17/28* (2013.01); *G06F 17/276* (2013.01); *G06F 17/289* (2013.01); *G06F 17/2827* (2013.01); *G06F 17/2836* (2013.01); *G06F 17/2845* (2013.01); *G06F 17/2854* (2013.01)

(58) Field of Classification Search
CPC ... G06F 17/2827; G06F 17/289; G06F 17/28; G06F 17/2836; G06F 17/2845

USPC ........................................................ 704/1–10
See application file for complete search history.

(56) References Cited

U.S. PATENT DOCUMENTS 4,661,924 A    4/1987 Okamoto et al.
4,674,044 A    6/1987 Kalmus et al.
(Continued)

FOREIGN PATENT DOCUMENTS

AU    199938259    11/1999
AU    761311    9/2003
(Continued)

OTHER PUBLICATIONS

Civera et al., "Computer-Assisted Translation Tool based on Finite-State Technology", In: Proc. of EAMT 2006, pp. 33-40 (2006)) in view of Rieman et al. (US PGPub 2008/0243834.*
(Continued)

*Primary Examiner* — Samuel G Neway
(74) *Attorney, Agent, or Firm* — Carr & Ferrell LLP

(57) ABSTRACT

The present technology dynamically generates auto-suggest dictionary data from translation data stored in memory at a server. The auto-suggest dictionary data may be transmitted to a remote device by the server for use in language translation. The auto-suggest dictionary data may be transferred as part of a package which includes content to be translated, translation meta-data, and various other data. The auto-suggest dictionary data may be generated at a first computing device, periodically or in response to an event, from translation data stored in memory. The auto-suggest dictionary may be transferred to a remote device along with content to be translated and other data, as part of a package, for use in translation of the content at the remote device.

22 Claims, 13 Drawing Sheets

(56) References Cited

U.S. PATENT DOCUMENTS

| | | |
|---|---|---|
| 4,677,552 A | 6/1987 | Sibley, Jr. |
| 4,789,928 A | 12/1988 | Fujisaki |
| 4,903,201 A | 2/1990 | Wagner |
| 4,916,614 A | 4/1990 | Kaji et al. |
| 4,962,452 A | 10/1990 | Nogami et al. |
| 4,992,940 A | 2/1991 | Dworkin |
| 5,005,127 A | 4/1991 | Kugimiya et al. |
| 5,020,021 A | 5/1991 | Kaji et al. |
| 5,075,850 A | 12/1991 | Asahioka et al. |
| 5,093,788 A | 3/1992 | Shiotani et al. |
| 5,111,398 A | 5/1992 | Nunberg et al. |
| 5,140,522 A | 8/1992 | Ito et al. |
| 5,146,405 A | 9/1992 | Church |
| 5,168,446 A | 12/1992 | Wiseman |
| 5,224,040 A | 6/1993 | Tou |
| 5,243,515 A | 9/1993 | Lee |
| 5,243,520 A | 9/1993 | Jacobs et al. |
| 5,283,731 A | 2/1994 | Lalonde et al. |
| 5,295,068 A | 3/1994 | Nishino et al. |
| 5,301,109 A | 4/1994 | Landauer et al. |
| 5,325,298 A | 6/1994 | Gallant |
| 5,349,368 A | 9/1994 | Takeda et al. |
| 5,408,410 A | 4/1995 | Kaji |
| 5,418,717 A | 5/1995 | Su et al. |
| 5,423,032 A | 6/1995 | Byrd et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,541,836 A | 7/1996 | Church et al. |
| 5,548,508 A | 8/1996 | Nagami |
| 5,555,343 A | 9/1996 | Luther |
| 5,587,902 A | 12/1996 | Kugimiya |
| 5,640,575 A | 6/1997 | Maruyama et al. |
| 5,642,522 A | 6/1997 | Zaenen et al. |
| 5,644,775 A | 7/1997 | Thompson et al. |
| 5,687,384 A | 11/1997 | Nagase |
| 5,708,825 A | 1/1998 | Sotomayor |
| 5,710,562 A | 1/1998 | Gormish et al. |
| 5,715,402 A | 2/1998 | Popolo |
| 5,724,593 A | 3/1998 | Hargrave, III et al. |
| 5,751,957 A | 5/1998 | Hiroya et al. |
| 5,764,906 A | 6/1998 | Edelstein et al. |
| 5,765,138 A | 6/1998 | Aycock et al. |
| 5,794,219 A | 8/1998 | Brown |
| 5,799,269 A | 8/1998 | Schabes et al. |
| 5,802,502 A | 9/1998 | Gell et al. |
| 5,802,525 A | 9/1998 | Rigoutsos |
| 5,818,914 A | 10/1998 | Fujisaki |
| 5,819,265 A | 10/1998 | Ravin et al. |
| 5,826,244 A | 10/1998 | Huberman |
| 5,842,204 A | 11/1998 | Andrews et al. |
| 5,844,798 A | 12/1998 | Uramoto |
| 5,845,143 A | 12/1998 | Yamauchi et al. |
| 5,845,306 A | 12/1998 | Schabes et al. |
| 5,848,386 A | 12/1998 | Motoyama |
| 5,850,442 A | 12/1998 | Muftic |
| 5,850,561 A | 12/1998 | Church et al. |
| 5,864,788 A | 1/1999 | Kutsumi |
| 5,884,246 A | 3/1999 | Boucher et al. |
| 5,895,446 A | 4/1999 | Takeda et al. |
| 5,917,484 A | 6/1999 | Mullaney |
| 5,950,194 A | 9/1999 | Bennett et al. |
| 5,956,711 A | 9/1999 | Sullivan et al. |
| 5,956,740 A | 9/1999 | Nosohara |
| 5,960,382 A | 9/1999 | Steiner |
| 5,966,685 A | 10/1999 | Flanagan et al. |
| 5,974,371 A | 10/1999 | Hirai et al. |
| 5,974,413 A | 10/1999 | Beauregard et al. |
| 5,987,401 A | 11/1999 | Trudeau |
| 5,987,403 A | 11/1999 | Sugimura |
| 6,044,363 A | 3/2000 | Mori et al. |
| 6,047,299 A | 4/2000 | Kaijima |
| 6,070,138 A | 5/2000 | Iwata |
| 6,092,034 A | 7/2000 | McCarley et al. |
| 6,092,035 A | 7/2000 | Kurachi et al. |
| 6,131,082 A | 10/2000 | Hargrave, III et al. |
| 6,139,201 A | 10/2000 | Carbonell et al. |
| 6,154,720 A | 11/2000 | Onishi et al. |
| 6,161,082 A | 12/2000 | Goldberg et al. |
| 6,163,785 A | 12/2000 | Carbonell et al. |
| 6,260,008 B1 | 7/2001 | Sanfilippo |
| 6,278,969 B1 | 8/2001 | King et al. |
| 6,285,978 B1 | 9/2001 | Bernth et al. |
| 6,301,574 B1 | 10/2001 | Thomas et al. |
| 6,304,846 B1 | 10/2001 | George et al. |
| 6,338,033 B1 | 1/2002 | Bourbonnais et al. |
| 6,341,372 B1 | 1/2002 | Datig |
| 6,345,244 B1 | 2/2002 | Clark |
| 6,345,245 B1 * | 2/2002 | Sugiyama et al. ............ 704/10 |
| 6,347,316 B1 | 2/2002 | Redpath |
| 6,353,824 B1 | 3/2002 | Boguraev et al. |
| 6,385,568 B1 | 5/2002 | Brandon et al. |
| 6,393,389 B1 | 5/2002 | Chanod et al. |
| 6,401,105 B1 | 6/2002 | Carlin et al. |
| 6,442,524 B1 | 8/2002 | Ecker et al. |
| 6,470,306 B1 | 10/2002 | Pringle et al. |
| 6,473,729 B1 | 10/2002 | Gastaldo et al. |
| 6,526,426 B1 | 2/2003 | Lakritz |
| 6,622,121 B1 | 9/2003 | Crepy et al. |
| 6,623,529 B1 | 9/2003 | Lakritz |
| 6,658,627 B1 | 12/2003 | Gallup et al. |
| 6,687,671 B2 | 2/2004 | Gudorf et al. |
| 6,731,625 B1 | 5/2004 | Eastep et al. |
| 6,782,384 B2 | 8/2004 | Sloan et al. |
| 6,952,691 B2 | 10/2005 | Drissi et al. |
| 6,993,473 B2 | 1/2006 | Cartus |
| 7,020,601 B1 | 3/2006 | Hummel et al. |
| 7,100,117 B1 | 8/2006 | Chwa et al. |
| 7,110,938 B1 | 9/2006 | Cheng et al. |
| 7,155,440 B1 | 12/2006 | Kronmiller et al. |
| 7,185,276 B2 | 2/2007 | Keswa |
| 7,194,403 B2 | 3/2007 | Okura et al. |
| 7,209,875 B2 | 4/2007 | Quirk et al. |
| 7,266,767 B2 | 9/2007 | Parker |
| 7,343,551 B1 * | 3/2008 | Bourdev ..................... 715/224 |
| 7,353,165 B2 | 4/2008 | Zhou et al. |
| 7,533,338 B2 | 5/2009 | Duncan et al. |
| 7,580,960 B2 | 8/2009 | Travieso et al. |
| 7,587,307 B2 | 9/2009 | Cancedda et al. |
| 7,594,176 B1 | 9/2009 | English |
| 7,596,606 B2 | 9/2009 | Codignotto |
| 7,627,479 B2 | 12/2009 | Travieso et al. |
| 7,640,158 B2 | 12/2009 | Detlef et al. |
| 7,693,717 B2 | 4/2010 | Kahn et al. |
| 7,698,124 B2 | 4/2010 | Menezes et al. |
| 7,925,494 B2 | 4/2011 | Cheng et al. |
| 7,983,896 B2 | 7/2011 | Ross et al. |
| 8,050,906 B1 | 11/2011 | Zimmerman et al. |
| 8,521,506 B2 | 8/2013 | Lancaster et al. |
| 8,620,793 B2 | 12/2013 | Knyphausen et al. |
| 8,874,427 B2 | 10/2014 | Ross et al. |
| 8,935,148 B2 | 1/2015 | Christ |
| 8,935,150 B2 | 1/2015 | Christ |
| 9,128,929 B2 | 9/2015 | Albat |
| 2002/0002461 A1 | 1/2002 | Tetsumoto |
| 2002/0093416 A1 | 7/2002 | Goers et al. |
| 2002/0099547 A1 | 7/2002 | Chu et al. |
| 2002/0103632 A1 | 8/2002 | Dutta et al. |
| 2002/0110248 A1 | 8/2002 | Kovales et al. |
| 2002/0111787 A1 | 8/2002 | Knyphausen et al. |
| 2002/0138250 A1 | 9/2002 | Okura et al. |
| 2002/0165708 A1 | 11/2002 | Kumhyr |
| 2002/0169592 A1 | 11/2002 | Aityan |
| 2002/0198701 A1 | 12/2002 | Moore |
| 2003/0004702 A1 | 1/2003 | Higinbotham |
| 2003/0016147 A1 | 1/2003 | Evans |
| 2003/0040900 A1 | 2/2003 | D'Agostini |
| 2003/0069879 A1 | 4/2003 | Sloan et al. |
| 2003/0078766 A1 | 4/2003 | Appelt et al. |
| 2003/0105621 A1 | 6/2003 | Mercier |
| 2003/0120479 A1 | 6/2003 | Parkinson et al. |
| 2003/0158723 A1 | 8/2003 | Masuichi et al. |
| 2003/0182279 A1 * | 9/2003 | Willows .................... 707/4 |

(56) References Cited

U.S. PATENT DOCUMENTS

| | | |
|---|---|---|
| 2003/0194080 A1 | 10/2003 | Michaelis et al. |
| 2003/0229622 A1 | 12/2003 | Middelfart |
| 2003/0233222 A1 | 12/2003 | Soricut et al. |
| 2004/0122656 A1 | 6/2004 | Abir |
| 2004/0172235 A1 | 9/2004 | Pinkham et al. |
| 2005/0021323 A1 | 1/2005 | Li |
| 2005/0055212 A1 | 3/2005 | Nagao |
| 2005/0075858 A1 | 4/2005 | Pournasseh et al. |
| 2005/0094475 A1 | 5/2005 | Naoi |
| 2005/0171758 A1 | 8/2005 | Palmquist |
| 2005/0197827 A1 | 9/2005 | Ross et al. |
| 2005/0222837 A1 | 10/2005 | Deane |
| 2005/0222973 A1 | 10/2005 | Kaiser |
| 2005/0273314 A1 | 12/2005 | Chang et al. |
| 2006/0015320 A1 | 1/2006 | Och |
| 2006/0095848 A1 | 5/2006 | Naik |
| 2006/0136277 A1 | 6/2006 | Perry |
| 2006/0256139 A1* | 11/2006 | Gikandi .................... 345/689 |
| 2006/0287844 A1 | 12/2006 | Rich |
| 2007/0118378 A1 | 5/2007 | Skuratovsky |
| 2007/0136470 A1 | 6/2007 | Chikkareddy et al. |
| 2007/0150257 A1 | 6/2007 | Cancedda et al. |
| 2007/0192110 A1 | 8/2007 | Mizutani et al. |
| 2007/0230729 A1 | 10/2007 | Naylor et al. |
| 2007/0233460 A1 | 10/2007 | Lancaster et al. |
| 2007/0233463 A1* | 10/2007 | Sparre .......................... 704/10 |
| 2007/0244702 A1 | 10/2007 | Kahn et al. |
| 2007/0294076 A1* | 12/2007 | Shore et al. .................. 704/2 |
| 2008/0077395 A1 | 3/2008 | Lancaster et al. |
| 2008/0141180 A1 | 6/2008 | Reed et al. |
| 2008/0147378 A1* | 6/2008 | Hall ............................... 704/4 |
| 2008/0243834 A1* | 10/2008 | Rieman et al. ................. 707/5 |
| 2008/0294982 A1 | 11/2008 | Leung et al. |
| 2009/0132230 A1 | 5/2009 | Kanevsky et al. |
| 2009/0187577 A1 | 7/2009 | Reznik et al. |
| 2009/0204385 A1 | 8/2009 | Cheng |
| 2009/0248182 A1 | 10/2009 | Logan et al. |
| 2009/0248482 A1 | 10/2009 | Knyphausen et al. |
| 2009/0326917 A1 | 12/2009 | Hegenberger |
| 2010/0223047 A1 | 9/2010 | Christ |
| 2010/0241482 A1 | 9/2010 | Knyphausen et al. |
| 2010/0262621 A1 | 10/2010 | Ross et al. |
| 2012/0046934 A1 | 2/2012 | Cheng et al. |
| 2012/0095747 A1 | 4/2012 | Ross et al. |
| 2012/0185235 A1 | 7/2012 | Albat |
| 2013/0346062 A1 | 12/2013 | Lancaster et al. |
| 2014/0006006 A1 | 1/2014 | Christ |
| 2014/0012565 A1 | 1/2014 | Lancaster et al. |
| 2015/0142415 A1 | 5/2015 | Cheng et al. |
| 2015/0169554 A1 | 6/2015 | Ross et al. |

FOREIGN PATENT DOCUMENTS

| | | |
|---|---|---|
| BE | 1076861 | 6/2005 |
| CA | 231184 | 7/2009 |
| CH | 1076861 | 6/2005 |
| CN | 1179289 | 12/2004 |
| CN | 1770144 | 5/2006 |
| CN | 101019113 | 8/2007 |
| CN | 101826072 | 9/2010 |
| CN | 101248415 | 10/2010 |
| CN | 102053958 | 5/2011 |
| DE | 69925831 | 6/2005 |
| DE | 2317447 | 1/2014 |
| EP | 0262938 | 4/1988 |
| EP | 0668558 | 8/1995 |
| EP | 0887748 | 12/1998 |
| EP | 1076861 | 2/2001 |
| EP | 1266313 | 12/2002 |
| EP | 1076861 | 6/2005 |
| EP | 1787221 | 5/2007 |
| EP | 1889149 | 2/2008 |
| EP | 2226733 A1 | 9/2010 |
| EP | 2317447 | 5/2011 |
| EP | 2336899 | 6/2011 |
| EP | 2317447 | 1/2014 |
| FR | 1076861 | 6/2005 |
| GB | 1076861 | 6/2005 |
| GB | 2433403 A | 6/2007 |
| GB | 2468278 | 9/2010 |
| GB | 2474839 | 5/2011 |
| GB | 2317447 | 1/2014 |
| IE | 1076861 | 6/2005 |
| JP | 04152466 | 5/1992 |
| JP | 05135095 | 6/1993 |
| JP | 05197746 | 8/1993 |
| JP | 06035962 | 2/1994 |
| JP | 06259487 | 9/1994 |
| JP | 07093331 A2 | 4/1995 |
| JP | 08055123 | 2/1996 |
| JP | 9114907 | 5/1997 |
| JP | 10063747 | 3/1998 |
| JP | 10097530 | 4/1998 |
| JP | 2002513970 | 5/2002 |
| JP | 2003150623 | 5/2003 |
| JP | 2004318510 | 11/2004 |
| JP | 2005-107597 | 4/2005 |
| JP | 2005197827 | 7/2005 |
| JP | 2007249606 | 9/2007 |
| JP | 2008152670 | 7/2008 |
| JP | 2008152760 | 7/2008 |
| JP | 4718687 | 4/2011 |
| JP | 2011095841 | 5/2011 |
| JP | 5473533 | 2/2014 |
| MX | 244945 | 4/2007 |
| NL | 2317447 | 1/2014 |
| WO | WO9406086 | 3/1994 |
| WO | WO 9804061 | 1/1998 |
| WO | 99/57651 A1 | 11/1999 |
| WO | 0057320 | 9/2000 |
| WO | WO0101289 | 1/2001 |
| WO | WO0129696 | 4/2001 |
| WO | WO0229622 | 4/2002 |
| WO | WO2006016171 | 2/2006 |
| WO | WO 2006121849 | 11/2006 |
| WO | 2008/147647 A1 | 4/2008 |
| WO | 2008/055360 A1 | 5/2008 |
| WO | 2008/083503 A1 | 7/2008 |

OTHER PUBLICATIONS

Notification of Reasons for Refusal for Japanese Application No. 2000-607125 mailed on Nov. 10, 2009 (Abstract Only).

Ross et al., U.S. Appl. No. 11/071,706, filed Mar. 3, 2005, Office Communication dated Dec. 13, 2007.

Ross et al., U.S. Appl. No. 11/071,706, filed Mar. 3, 2005, Office Communication dated Oct. 6, 2008.

Ross et al., U.S. Appl. No. 11/071,706, filed Mar. 3, 2005, Office Communication dated Jun. 9, 2009.

Ross et al., U.S. Appl. No. 11/071,706, filed Mar. 3, 2005, Office Communication dated Feb. 18, 2010.

Colucci, Office Communication for U.S. Appl. No. 11/071,706 dated Sep. 24, 2010.

Och, et al., "Improved Alignment Models for Statistical Machine Translation," In: Proceedings of the Joint Workshop on Empirical Methods in NLP and Very Large Corporations, 1999, p. 20-28, downloaded from http://www.actweb.org/anthology-new/W/W99/W99-0604.pdf.

International Search Report and Written Opinion dated Sep. 4, 2007 in Application No. PCT/US06/17398.

XP 002112717—Machine translation software for the Internet, Harada K.; et al, vol. 28, Nr:2, pp. 66-74. Sanyo Technical Review—San'yo Denki Giho, Oct. 1, 1996 Hirakata, JP—ISSN 0285-516X.

XP 000033460—Method to Make a Translated Text File Have the Same Printer Control Tags as the Original Text File, vol. 32, Nr:2, pp. 375-377, IBM Technical Disclosure Bulletin, Jul. 1, 1989 International Business Machines Corp. (Thornwood), US—ISSN 0018-8689.

XP 002565038—Integrating Machine Translation into Translation Memory Systems, Matthias Heyn, pp. 113-126, TKE. Terminology and Knowledge Engineering. Proceedingsinternational Congress on

(56) References Cited

OTHER PUBLICATIONS

Terminology and Knowledge Engineering, Aug. 29-Aug. 30, 1996 XX, XX.
XP 002565039—Linking translation memories with example-based machine translation, Michael Carl; Silvia Hansen, pp. 617-624, Machine Translation Summit. Proceedings, Sep. 1, 1999.
XP 55024828—TransType2—An Innovative Computer-Assisted Translation System, ACL 2004, Jul. 21, 2004, Retrieved from the Internet: :http://www.mt-archive.info/ACL-2004-Esteban.pdf [retrieved on Apr. 18, 2012].
Bourigault, Surface Grammatical Analysis for the Extraction of Terminological Noun Phrases, Proc. of Coling-92, Aug. 23, 1992, pp. 977-981, Nantes, France.
Thurmair, Making Term Extraction Tools Usable, The Joint Conference of the 8th International Workshop of the European Association for Machine Translation, May 15, 2003, Dublin, Ireland.
Sanfillipo, Section 5.2 Multiword Recognition and Extraction, Eagles LE3-4244, Preliminary Recommendations on Lexical Semantic Encoding, Jan. 7, 1999.
Hindle et al., Structural Ambiguity and lexical Relations, 1993, Association for Computational Linguistics, vol. 19, No. 1, pp. 103-120.
Ratnaparkhi, A Maximum Entropy Model for Part-of-Speech Tagging, 1996, Proceedings of the conference on empirical methods in natural language processing, V.1, pp. 133-142.
Komatsu, H et al, "Corpus-based predictive text input", "Proceedings of the 2005 International Conference on Active Media Technology", 2005, IEEE, pp. 75-80, ISBN 0-7803-9035-0.
Saiz, Jorge Civera: "Novel statistical approaches to text classification, machine translation and computer-assisted translation" Doctor En Informatica Thesis, May 22, 2008, XP002575820 Universidad Polit'ecnica de Valencia, Spain. Retrieved from Internet: http://dspace.upv.es/manakin/handle/10251/2502 [retrieved on Mar. 30, 2010]. p. 111-131.
De Gispert, A., Marino, J.B. and Crego, J.M.: "Phrase-Based Alignment Combining Corpus Cooccurrences and Linguistic Knowledge" Proc. of the Int. Workshop on Spoken Language Translation (IWSLT'04), Oct. 1, 2004, XP002575821 Kyoto, Japan. Retrieved from the Internet: http://mi.eng.cam.ac.uk/~ad465/agispert/docs/papers/TP_gispert.pdf [retrieved on Mar. 30, 2010].
Planas, Emmanuel: "SIMILIS Second-generation translation memory software," Translating and the Computer 27, Nov. 2005 [London: Aslib, 2005].
Somers, H. "Review Article: Example-based Machine Translation," Machine Translation, Issue 14, pp. 113-157, 1999.
Okura, Seiji, "Translation Assistance by Autocomplete," The Association for Natural Language Processing, Publication 13th Annual Meeting, Mar. 2007, p. 678-679.
Soricut, R, et al., "Using a Large Monolingual Corpus to Improve Translation Accuracy," Proc. of the Conference of the Association for Machine Translation in the Americas (Amta-2002), Aug. 10, 2002, pp. 155-164, XP002275656.
Fung et al. "An IR Approach for Translating New Words from Nonparallel, Comparable Texts," Proceeding COLING '998 Proceedings of the 17th International Conference on Computational Lingiustics, 1998.
First Office Action mailed Dec. 26, 2008 in Chinese Patent Application 200580027102.1, filed Aug. 11, 2005.
Second Office Action mailed Aug. 28, 2009 in Chinese Patent Application 200580027102.1, filed Aug. 11, 2005.
Third Office Action mailed Apr. 28, 2010 in Chinese Patent Application 200580027102.1, filed Aug. 11, 2005.
Summons to attend oral proceeding pursuant to Rule 115(1)(EPC) mailed Mar. 20, 2012 in European Patent Application 05772051.8 filed Aug. 11, 2005.
Notification of Reasons for Rejection mailed Jan. 9, 2007 for Japanese Patent Application 2000-547557, filed Apr. 30, 1999.
Decision of Rejection mailed Jul. 3, 2007 for Japanese Patent Application 2000-547557, filed Apr. 30, 1999.
Extended European Search Report and Written Opinion mailed Jan. 26, 2011 for European Patent Application 10189145.5, filed on Oct. 27, 2010.
Notice of Reasons for Rejection mailed Jun. 26, 2012 for Japanese Patent Application P2009-246729. filed Oct. 27, 2009.
Search Report mailed Jan. 22, 2010 for United Kingdoms Application GB0918765.9, filed Oct. 27, 2009.
Notice of Reasons for Rejection mailed Mar. 30, 2010 for Japanese Patent Application 2007-282902. filed Apr. 30, 1999.
Decision of Rejection mailed Mar. 15, 2011 for Japanese Patent Application 2007-282902, filed Apr. 30, 1999.
First Office Action mailed Oct. 18, 2011 for Chinese Patent Application 2009102531926, filed Dec. 14, 2009.
Second Office Action mailed Aug. 14, 2012 for Chinese Patent Application 2009102531926, filed Dec. 14, 2009.
European Search Report mailed Apr. 12, 2010 for European Patent Application 09179150, filed Dec. 14, 2009.
First Examination Report mailed Jun. 16, 2011 for European Patent Application 09179150.9, filed Dec. 14, 2009.
Notice of Reasons for Rejection mailed Jul. 31, 2012 for Japanese Patent Application 2010-045531, filed Mar. 2, 2010.
First Examination Report mailed Oct. 26, 2012 for United Kingdom Patent Application GB0903418.2, filed Mar. 2, 2009.
First Office Action mailed Jun. 19, 2009 for Chinese Patent Application 200680015388.6, filed May 8, 2006.
First Examination Report mailed Nov. 26, 2009 for European Patent Application 05772051.8, filed May 8, 2006.
Second Examination Report mailed Feb. 19, 2013 for European Patent Application 06759147.9, filed May 8, 2006.
Langlais, et al. "TransType: a Computer-Aided Translation Typing System", in Conference on Language Resources and Evaluation, 2000.
First Notice of Reasons for Rejection mailed Jun. 18, 2013 for Japanese Patent Application 2009-246729, filed Oct. 27, 2009.
First Notice of Reasons for Rejection mailed Jun. 4, 2013 for Japanese Patent Application 2010-045531, filed Oct. 27, 2009.
Rejection Decision mailed May 14, 2013 for Chinese Patent Application 200910253192.6, filed Dec. 14, 2009.
Matsunaga, et al. "Sentence Matching Algorithm of Revised Documents with Considering Context Information," IEICE Technical Report, 2003.
Trados Translator's Workbench for Windows, 1994-1995, Trados GbmH, Stuttgart, Germany, pp. 9-13 and 27-96.
New Auction Art Preview, www.netauction.net/dragonart.html, "Come bid on original illustrations," by Greg & Tim Hildebrandt, Feb. 3, 2001. Retrieved on Nov. 16, 2011.
BidNet, www.bidnet.com, "Your link to the State and Local Government Market," including Bid Alert Service, Feb. 7, 2009. Retrieved on Nov. 16, 2011.
Christie's, www.christies.com, including "How to Buy," and "How to Sell," Apr. 23, 2009. Retrieved on Nov. 16, 2011.
Artrock Auction, www.commerce.com, Auction Gallery, Apr. 7, 2007. Retrieved on Nov. 16, 2011.
Pennington, Paula K. Improving Quality in Translation Through an Awareness of Process and Self-Editing Skills. Eastern Michigan University, ProQuest, UMI Dissertations Publishing, 1994.
Kumano et al., "Japanese-English Translation Selection Using Vector Space Model," Journal of Natural Language Processing; vol. 10; No. 3; (2003); pp. 39-59.
Office Action mailed Feb. 24, 2014 for Chinese Patent Application No. 201010521841.9, filed Oct. 25, 2010.
Extended European Search Report mailed Oct. 24, 2014 for European Patent Application 10185842.1, filed Oct. 1, 2010.
Summons to attend oral proceeding pursuant to Rule 115(1)(EPC) mailed Oct. 13, 2014 in European Patent Application 00902634.5 filed Jan. 26, 2000.
Summons to attend oral proceeding pursuant to Rule 115(1)(EPC) mailed Feb. 3, 2015 in European Patent Application 06759147.9 filed May 8, 2006.
Decision to Refuse mailed Mar. 2, 2015 in European Patent Application 00902634.5 filed Jan. 26, 2000.

(56) References Cited

OTHER PUBLICATIONS

Brief Communication mailed Jun. 17, 2015 in European Patent Application 06759147.9 filed May 8, 2006.
Somers, H. "EBMT Seen as Case-based Reasoning" Mt Summit VIII Workshop on Example-Based Machine Translation, 2001, pp. 56-65, XP055196025.
The Minutes of Oral Proceedings mailed Mar. 2, 2015 in European Patent Application 00902634.5 filed Jan. 26, 2000.
Notification of Reexamination mailed Aug. 18, 2015 in Chinese Patent Application 200910253192.6, filed Dec. 14, 2009.
Decision to Refuse mailed Aug. 24, 2015 in European Patent Application 06759147.9, filed May 8, 2006.

* cited by examiner

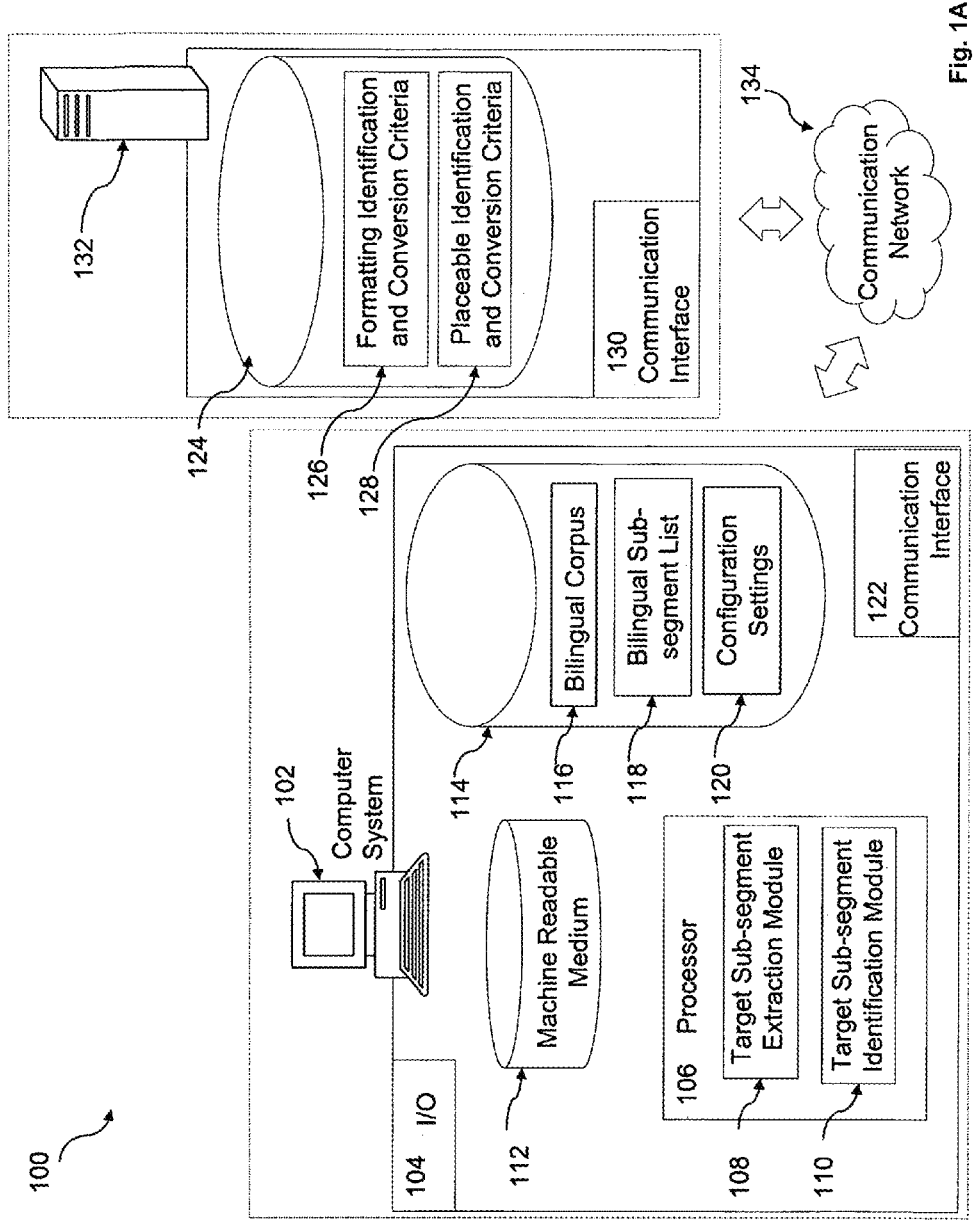

Fig. 5

DYNAMIC GENERATION OF AUTO-SUGGEST DICTIONARY FOR NATURAL LANGUAGE TRANSLATION

CROSS-REFERENCE TO RELATED APPLICATIONS

This application is a continuation-in-part and claims the priority benefit of U.S. patent application Ser. No. 12/636,970, titled "Computer-Assisted Natural Language Translation," filed Dec. 14, 2009 (now U.S. Pat. No. 8,935,148, issued on Jan. 13. 2015), which claims the priority benefit of patent application GB-0903418.2, titled "Computer-Assisted Natural Language Translation," filed Mar. 2, 2009. The disclosures of the aforementioned applications are incorporated herein by reference.

BACKGROUND

Translation memories have been employed in the natural language translation industry for decades with a view to making use of previously translated text of high translation quality in current machine-assisted translation projects. Conventionally, translation memories leverage existing translations on the sentence or paragraph level. Due to the large granularity of a sentence or paragraph in a translation memory, the amount of re-use possible is limited due to the relatively low chance of a whole sentence or paragraph matching the source text.

One way to improve leverage of previous translations is through the use of a term base or multilingual dictionary which has been built up from previous translations over a period of time. The development and maintenance of such term bases requires substantial effort and in general requires the input of skilled terminologists. Recent advancements in the area of extraction technology can reduce the amount of human input required in the automatic extraction of term candidates from existing monolingual or bilingual resources. However, the human effort required in creating and maintaining such term bases can still be considerable.

A number of source code text editors include a feature for predicting a word or a phrase that the user wants to type in without the user actually typing the word or phrase completely. Source code text editors that predict a word or phrase typically do so based on locally stored sentences or paragraphs. For example, some word processors, such as Microsoft Word™, use internal heuristics to suggest potential completions of a typed-in prefix in a single natural language.

US patent application no. 2006/0256139 describes a predictive text personal computer with a simplified computer keyboard for word and phrase auto-completion. The personal computer also offers machine translation capabilities, but no previously translated text is re-used.

There is therefore a need to improve the amount of re-use of previously translated text in machine-assisted translation projects, whilst reducing the amount of human input required.

SUMMARY

The present technology dynamically generates auto-suggest dictionary data and provides the data to a remote device for use in natural language translation. The auto-suggest dictionary data may be generated at a first computing device from translation data stored in memory, and may be generated periodically or in response to an event. The auto-suggest dictionary may be transferred to a remote device along with content to be translated and other data, as part of a package, for use in translation of the content at the remote device. Generating the auto-suggest dictionary from translation data, which includes reliable translation of source content in a target language, provides for a more reliable and diverse range of content for the auto-suggest dictionary data.

In some embodiments, content may be translated by generating auto-suggest dictionary data comprising a sentence segment in a source language and a translation of the sentence segment in a target language. The auto-suggest dictionary data may be generated from stored translation data. The auto-suggest dictionary data may be transmitted from a server to a remote device.

In various embodiments, a system for managing translation of content may include a dictionary generation module and a package management module stored in memory. The dictionary generation module may be executed by a processor to generate an auto-suggest dictionary data from stored translation data. The package management module may be executed by a processor to transmit a package to a remote device. The package may include the auto-suggest dictionary data.

BRIEF DESCRIPTION OF THE DRAWINGS

FIG. 1A is a system diagram according to embodiments of the present technology.

Figure 5:
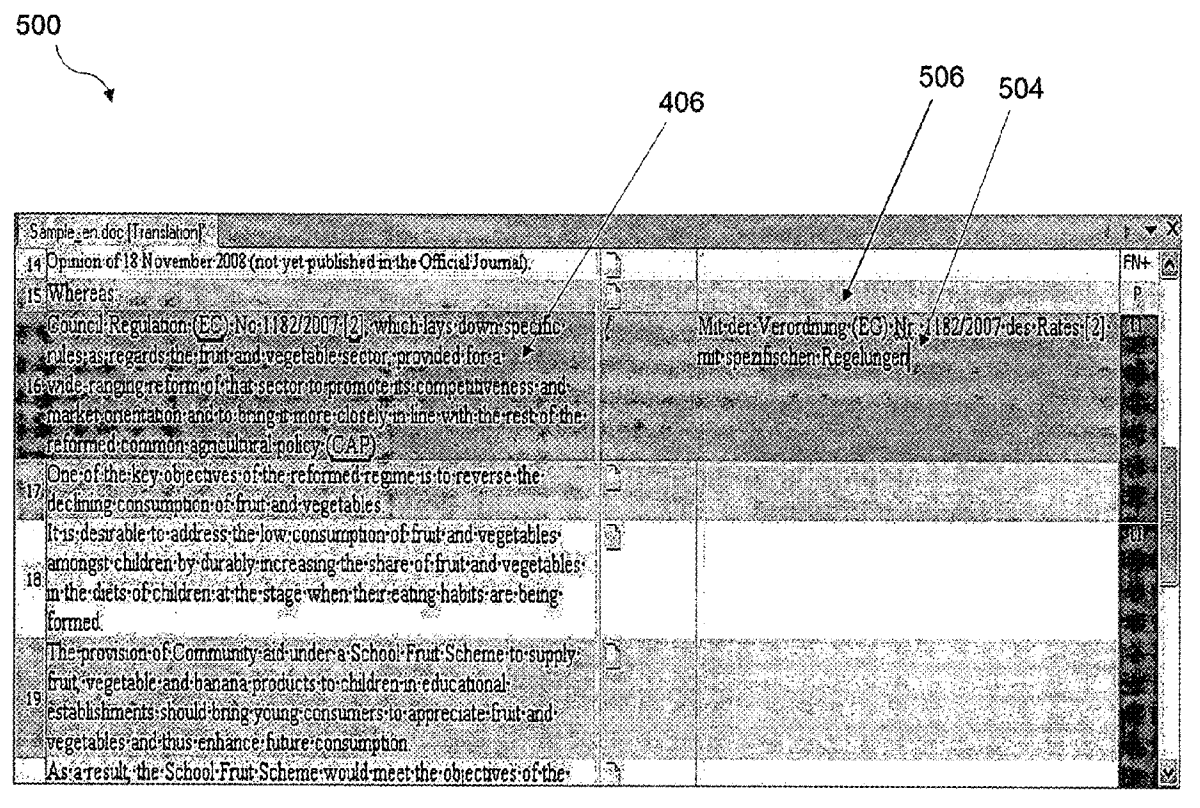

FIG. 5 is a screenshot depicting insertion of a target sub-segment into a full translation of the source material according to embodiments of the present technology.

DESCRIPTION OF EXEMPLARY EMBODIMENTS

Figure 1B:
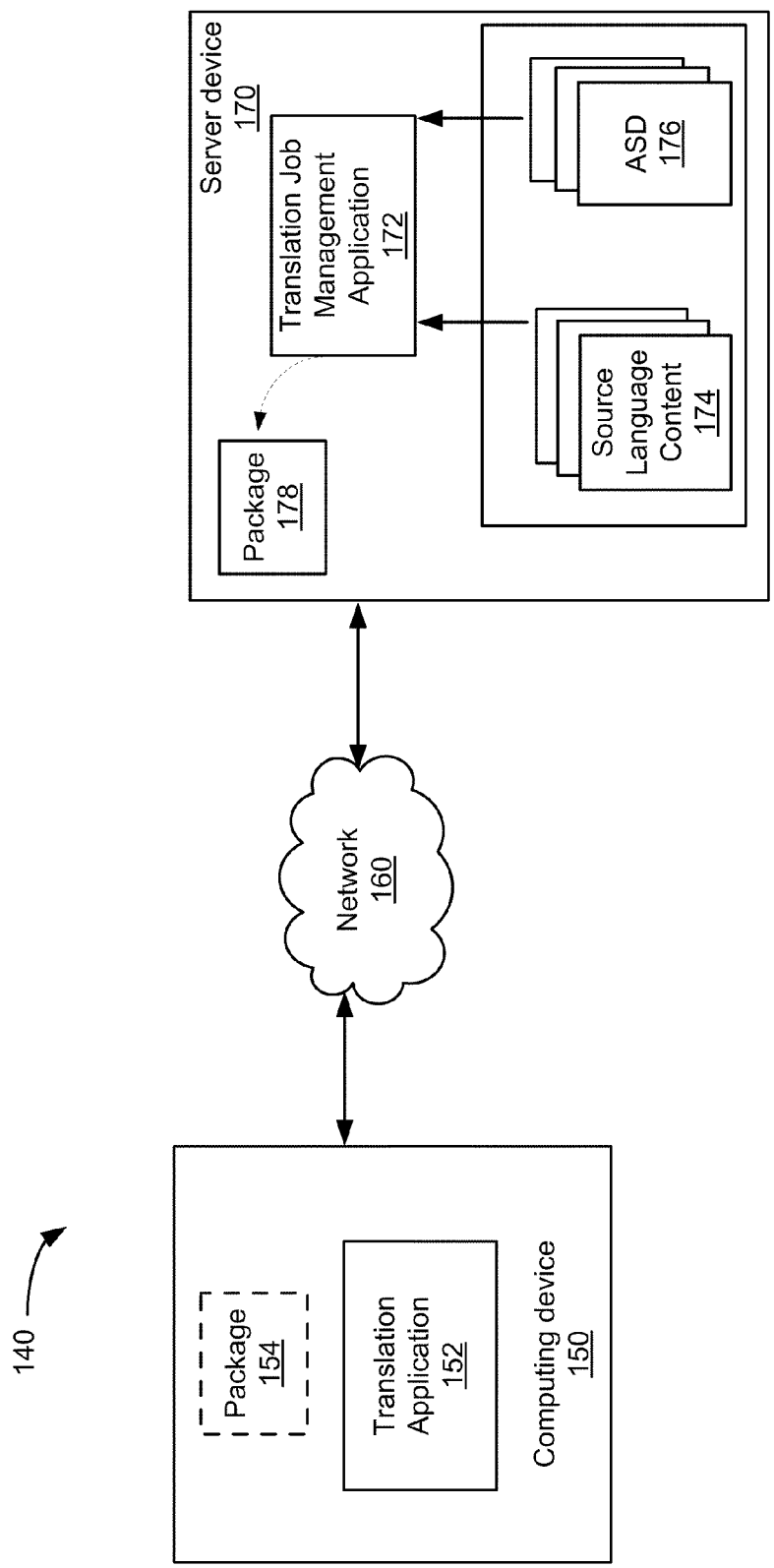
FIG. 1B is a system diagram according to alternate embodiments of the present technology.

The present technology dynamically generates auto-suggest dictionary data from translation data stored in memory at a server. The auto-suggest dictionary data may be transmitted to a remote device by the server for use in language translation. The auto-suggest dictionary data may transferred as part of a package which includes content to be translated, translation meta-data, and other data. The auto-suggest dictionary data may be generated at a first computing device, periodically or in response to an event, from translation data stored in memory. The auto-suggest dictionary may be transferred to a remote device along with content to be translated and other data, as part of a package, for use in translation of the content at the remote device. Generating the auto-suggest dictionary from translation data, which includes reliable translation of source content in a target language, provides for a more reliable and diverse range of content for the auto-suggest dictionary data.

In the accompanying figures, various parts are shown in more than one figure; for clarity, the reference numeral initially assigned to a part, item or step is used to refer to the same part, item or step in subsequent figures.

In the following description, the term "previously translated text segment pair" refers to a source text segment in a source natural language and its corresponding translated segment in a target natural language. The previously translated text segment pair may form part of a bilingual corpus such as a translation memory located in an electronic database or memory store. The term "target segment" is to be understood to comprise an amount of text in the target natural language, for example a sentence or paragraph. The term "target sub-segment" is to be understood to comprise a smaller excerpt of a segment in the target natural language, for example a word, fragment of a sentence, or phrase, as opposed to a full sentence or paragraph.

FIG. 1A is a system 100 for use in translation of a source material in a source natural language into a target natural language according to embodiments of the present technology.

System 100 includes a computer system 102 and a remote server 132. In this particular embodiment of the present technology, computer system 102 is shown in more detail to include a plurality of functional components. The functional components may be consolidated into one device or distributed among a plurality of devices. System 100 includes a processor 106 which, in turn, includes a target sub-segment extraction module 108 and a target sub-segment identification module 110 which are conceptual modules corresponding to functional tasks performed by processor 106. To this end, computer system 102 includes a machine-readable medium 112, e.g. main memory, a hard disk drive, or the like, which carries thereon a set of instructions to direct the operation of computer system 102 or processor 106, for example in the form of a computer program. Processor 106 may comprise one or more microprocessors, controllers, or any other suitable computer device, resource, hardware, software, or embedded logic. Furthermore, the software may be in the form of code embodying a web browser.

Computer system 102 further includes a communication interface 122 for electronic communication with a communication network 134. In addition, a remote server system 132 is also provided, comprising a communication interface 130, operable to communicate with the communication interface 122 of the computer system 102 through a communication network 134. In FIG. 1A, the computer system 102 operates in the capacity of a client machine and can communicate with a remote server 132 via communication network 134. Each of the communication interfaces 122, 130 may be in the form of a network card, modem, or the like.

Additionally, computer system 102 may comprise a database 114 or other suitable storage medium operable to store a bilingual corpus 116, a bilingual sub-segment list 118 and a configuration settings store 120. Bilingual corpus 116 may, for example, be in the form of a translation memory and be operable to store a plurality of previously translated text segment pairs such as sentences and/or paragraphs. Bilingual sub-segment list 118 may be in the form of a bilingual sub-segment repository such as a bilingual dictionary, which is used to store a list of sub-segments such as words and/or phrases. The sub-segments may be in the form of a list of source sub-segments in a source natural language and an aligned, corresponding list of translated target sub-segments. Configuration settings store 120 may comprise a plurality of user-defined and/or default configuration settings for system 100, such as the minimum number of text characters that are required in a target sub-segment before it is outputted for review, and the maximum number of target sub-segments which can be outputted for review by the translation system operator at any one time. These configuration settings are operable to be implemented on computer system 102.

Server 132 includes a storage device 124 in which a list of formatting identification and conversion criteria 126 and a list of placeable identification and conversion criteria 128 are stored. Storage device 124 may, for example, be a database or other suitable storage medium located within or remotely to server 132.

Computer system 102 further includes a user input/output interface 104 including a display (e.g. a computer screen) and an input device (e.g. a mouse or keyboard). User interface 104 is operable to display various data such as source segments and outputted target text sub-segments, and also to receive data inputs from a translation system operator.

FIG. 1B is a system diagram according to another embodiment of the present technology. The system 140 of FIG. 1B includes computing device 150, network 160, and server device 170. Computing device 150 may communicate with server device 170. Computing device 150 may include translation application 152 and may receive and process a package 154. Computing device 150 may include other components and modules than those shown in FIG. 1B (not illustrated), such as one or more elements discussed with respect to FIG. 1A or 2. Translation application 152 may be stored in memory and executed by a processor to perform the functionality of target sub-segment extraction module 108 and target sub-segment identification module 110.

Network 160 may be implemented by one or more local area network (LAN)s, wide area network (WAN)s, private networks, public networks, intranets, the Internet, or a combination of these. Computing device 150 may communicate with server device 170 via network 160.

Server device 170 may be implemented as one more servers, for example a web server, an application server, a database server, a mail server, and various other servers. Service device 170 may include source language content files 174, auto-suggest dictionary data (ASD) sets 176, and translation job management application(s) 172. Other modules and components may also be included in server device 170, such as for example bilingual corpora, bilingual sub-segment lists, formatting identification and conversion criteria, placeable identification and conversion criteria, and various other data and modules.

Translation job management application 172 may receive content for translation in a source language as well as meta-data for the translation job through, for example, an interface provided by server device 170. The meta-data may indicate information associated with the translation job, such as the target language, the date and time the translation job was received and should be completed by, an identify of the entity that requested the translation, and various other data. The received source language content and meta-data may be stored in memory of server device 170.

The sets of ASD data 176 may include segments of a sentence in a natural source language and corresponding translations of the segments in a natural target language. The corresponding segment pairs may be generated from a translation memory. A sentence in a natural source language and a corresponding translated sentence in a natural target language comprise a translation unit. Translation memory may include one or more translation units. The sets of ASD data 176 may be generated from the translation units stored in translation memory of server device 170. Generating corresponding segment pairs from translation memory is discussed in more detail herein.

Translation job management application 172 may update the ASD data. As translation jobs are performed, additional translation units may be stored within the translation memory. Upon occurrence of an event, translation job management application 172 may determine if the ASD data for the particular source language and target language should be updated. The event may be triggered periodically, in response to a large addition to the translation memory, or some other event. The update may be performed, for example, if a change in size of the translation memory since the last update, over an interval of time, or some other period of time is greater than a threshold (or otherwise satisfies a threshold). When updating the ASD data, application 172 may replace ASD data for a particular source language-target language pair or save a new version of the ASD data.

Translation job management application 172 may generate a package for implementing a translation of received source language content and transmit the package to computing device 150. When translation job content, comprising content in a source language to be translated and parameters for the translation in the form of meta-data, is received by server device 170, translation job management application 172 generates a package 178 and transmits the package 178 to computing device 150. The package may be generated to contain the latest version of the ASD data 176 which corresponds to the source language and target language for the translation job to be performed. In addition to the ASD data, the package may also contain the content to be translated, meta-data for the translation project, translation memory content (translation units), term base information such as placeable identification and conversion data, and various other data.

Computing device 150 may receive the package and may store a local copy of the package 154. A translator may then translate the content via translation application 152 at computing device 150. Translation application 152 may transmit translated portions of the content and other data to translation job management application 172.

Figure 2:
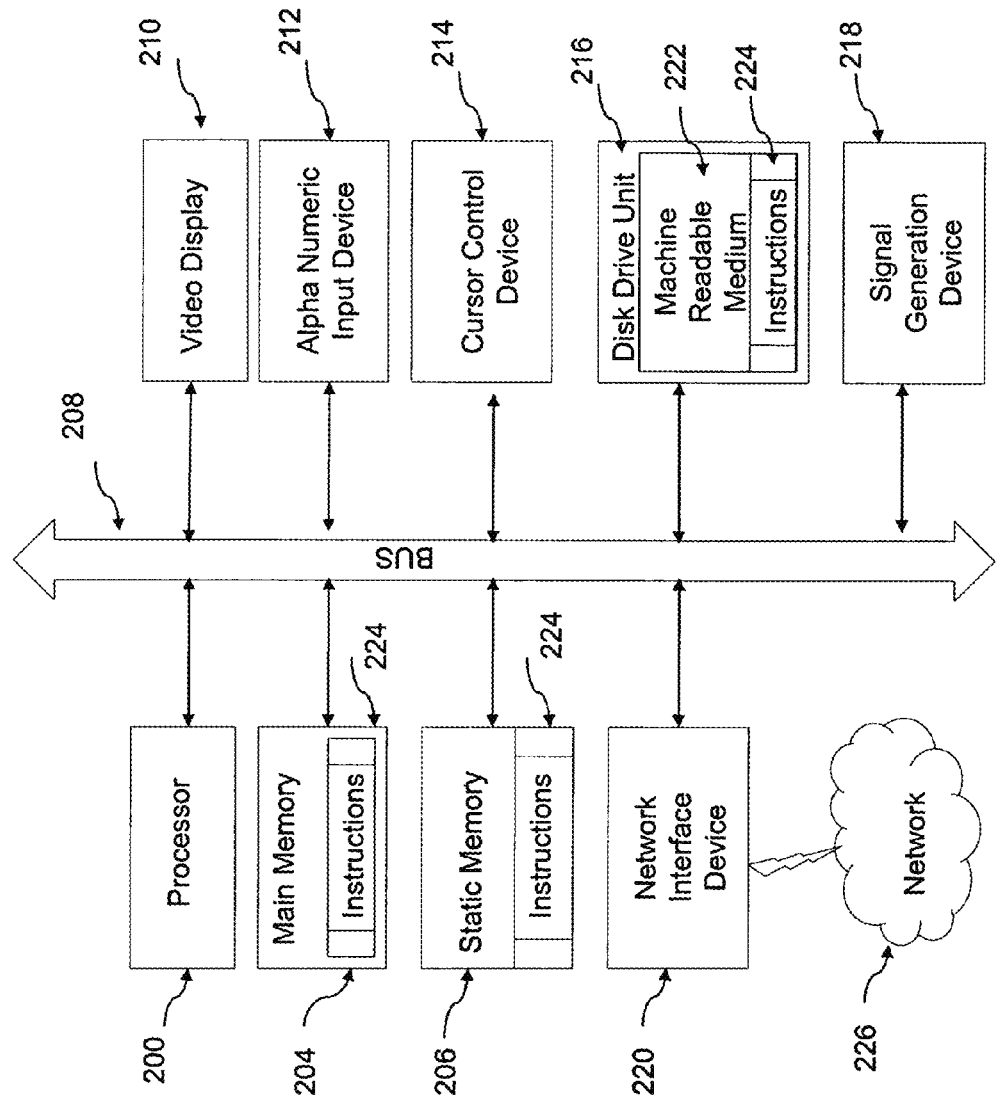
FIG. 2 is a schematic diagram depicting the computer system of FIG. 1 according to embodiments of the present technology.

FIG. 2 is a diagrammatic representation of computer system 102, computing device 150, or server device 170 (or various other computing systems) within which a set of instructions may be executed for causing the computer system (s) to perform any one or more of the methodologies discussed herein. In alternative embodiments, the computing systems may operate as standalone devices or may be connected (e.g., networked) to other computer systems or machines. In a networked deployment, the computing systems may operate in the capacity of a server or a client machine in a server-client network environment, or as a peer machine in a peer-to-peer (or distributed) network environment. One, some, or all of the computing systems may comprise a personal computer (PC), a tablet PC, an iPad, a set-top box (STB), a personal digital assistant (PDA), a cellular, satellite, or wired telephone, a web appliance, a smartphone, an iPhone, a network router, switch or bridge, or any machine capable of executing a set of instructions (sequential or otherwise) that specify actions to be taken by that machine. Further, while only a single machine is illustrated, each of computer system 102, computing device 150, and/or server device 170 may include any collection of machines or computers that individually or jointly execute a set of (or multiple set) of instructions to perform any one or more of the methodologies discussed herein.

Each of the computing systems may include a processor 200 (e.g. a central processing unit (CPU), a graphics processing unit (GPU) or both), a main memory 204 and a static memory 206, which communicate with each other via bus 208. Each computing system may further include a video display unit 210 e.g. liquid crystal display (LCD) or a cathode ray tube (CRT)). A computing system as described herein may also include an alphanumeric input device 212 (e.g., a keyboard), a user interface (UI) navigation device 214 (e.g. a mouse or other user control device), a disk drive unit 216, a signal generation device 218 (e.g. a speaker) and a network interface device 220.

Disk drive unit 216 may include a transitory or non-transitory machine-readable medium 222 on which is stored one or more sets of instructions and/or data structures (e.g., software 224) embodying or utilized by any one or more of the methodologies or functions described herein. Software 224 may also reside, completely or at least partially, within main memory 204 and/or within processor 202 during execution thereof by one, some, or all of the computing systems, where main memory 204 and processor 200 may also constitute machine-readable media.

Instructions such as software 224 may further be transmitted or received over a network 226 via a network interface device 220 utilizing any one of a number of well-known transfer protocols, e.g. the HyperText Transfer Protocol (HTTP).

Figure 3:
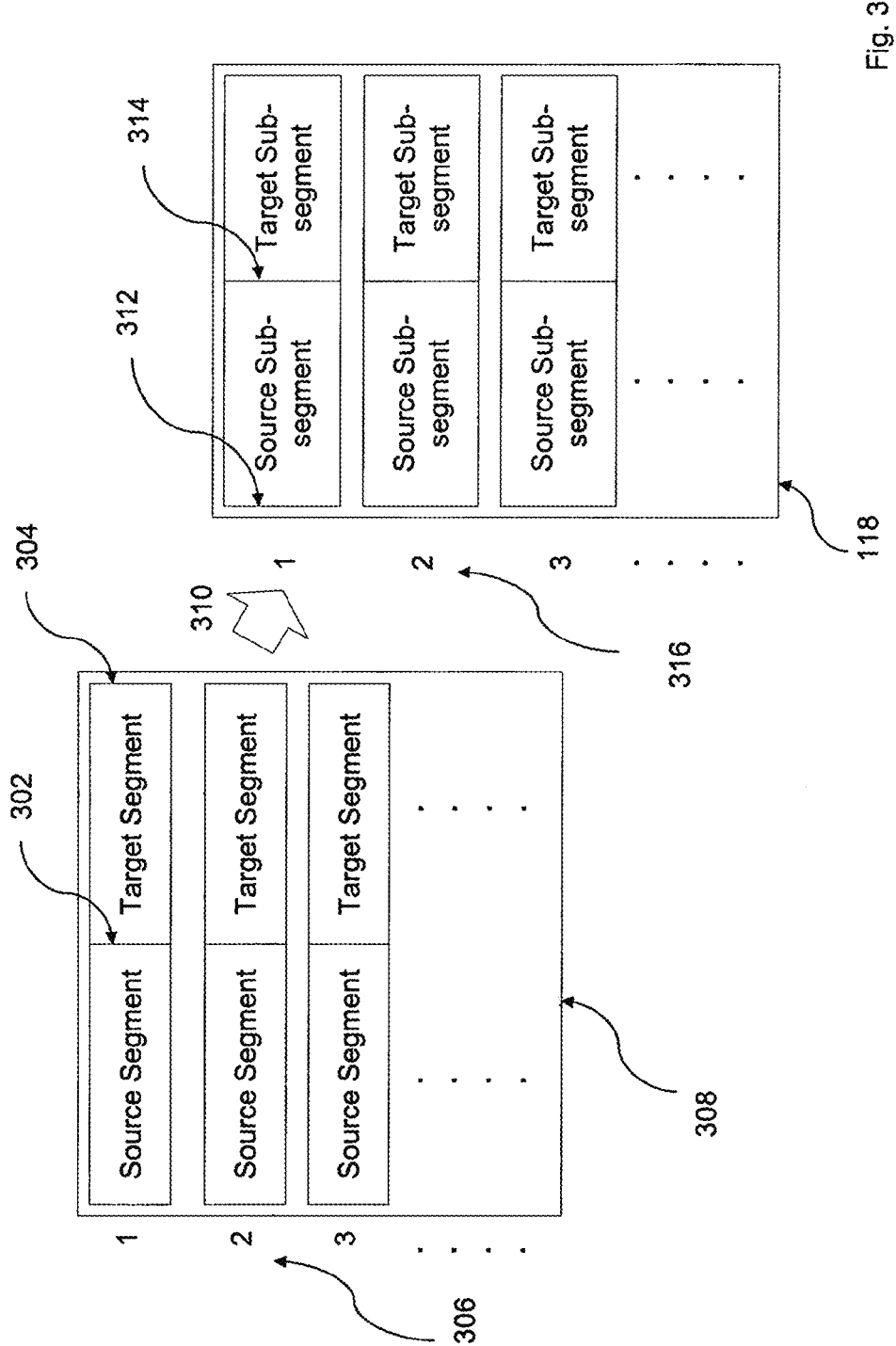
FIG. 3 is a schematic diagram illustrating extraction from a bilingual corpus according to embodiments of the present technology.

FIG. 3 is a schematic diagram showing extraction process 310 from a bilingual corpus according to embodiments of the present technology. In this embodiment, bilingual corpus 116 is in the form of a translation memory 308, which is a database that stores a number of text segment pairs 306 that have been previously translated, each of which include a source text segment 302 in the source natural language and a corresponding translated target segment 304 in a target natural language.

During the extraction process 310, text sub-segments pairs 316 are extracted from text segments in the translation memory and stored in bilingual sub-segment list 118 in database 114. Each text sub-segment pair 316 stored in bilingual sub-segment list 118 comprises a source text sub-segment 312 in a source natural language and a corresponding translated target text sub-segment 314 in a target natural language. In this embodiment, bilingual sub-segment list 118 is in the form of a bilingual phrase/word list extracted from translation memory 308 containing sentences and/or paragraphs, although other levels of granularity between segments and sub-segments may be employed.

Extraction process 310 involves computing measures of co-occurrence between words and/or phrases in source text segments and words and/or phrases in corresponding translated target text segments in translation memory 308. Computing the measures of co-occurrence uses a statistical approach to identify target sub-segments 314 and source sub-segments 312 which are translations of each other. The extraction process involves deciding whether the co-occurrence of a source text sub-segment 312 in the source text segment 302 and a target text sub-segment 314 in the aligned target text segment 304 is coincidence (i.e. random) or not. If not sufficiently random, it is assumed that the sub-segments 312, 314 are translations of each other. Additional filters or data sources can be applied to verify these assumptions.

The extraction process requires previously translated bilingual materials (such as translation memory 308) with the resulting target text sub-segments being stored in bilingual sub-segment list 118. Typically, the bilingual materials need to be aligned on the segment level (such as on the sentence or paragraph level) which means that the correspondence between a source text segment 302 and its translated target text segment 304 is explicitly marked up.

An algorithm which can be used to estimate the likelihood of bilingual sub-segment 312, 314 associations is a chi-square based algorithm which is also used to produce an initial one-to-one list of sub-segment (preferably word) translations. This initial list can then be extended to larger sub-segments such as phrases.

As will be described below in more detail, extraction process 310 is carried out offline, i.e. in advance of translation of a source material by a translator. The results of the extraction process are then consulted during runtime, i.e. once a translation system operator has begun translating a source material.

Embodiments of the present technology will now be described with reference to the screenshots of FIGS. 4, 5 and 6.

Screenshot 400 of a Graphical User Interface (GUI) part of user input/output interface 104 provides an example of identified target sub-segments 314 being output, i.e. displayed for review by a translation system operator. In this embodiment of the present technology, the source material 404, in a source natural language (English), comprises a number of source segments 414 that are to be translated into a target natural language (German).

In this particular embodiment, screenshot 400 shows source segment 406 comprising the paragraph "Council regulation (EC) No 1182/2007 which lays down specific rules as regards the fruit and vegetable sector, provided for a wide ranging reform of that sector to promote its competitiveness and market orientation and to bring it more closely in line with the rest of the reformed common agricultural policy (CAP)" in English. A first part of the translation of the source segment 406 has already been input (either purely by the translation system operator or with the assistance of the present technology) as shown by displayed sub-segment 408 of translated text which comprises the text "Mit der Verordnung (EG) Nr 1182/2007 des Rates [2] mit".

To continue the process of translating source segment 406, the translation system operator continues to review the source segment 406 and provides the system with data input in the form of a first data input 410 in the target natural language, for example through a suitable keyboard or mouse selection via user input/output interface 104. First data input 410 is a first portion of a translation, created and input by the operator character-by-character, of elements of the source segment 406, in this case the text characters "sp" which are the first two text characters of the translation of the English word "specific" into German. One or more target sub-segments 412 associated with the first data input are then identified from the target text sub-segments stored in bilingual sub-segment list 118 and output for review by the translation system operator. The target sub-segments which are identified and output are associated with the first data input as they have the text characters "sp" in common. In the embodiment depicted in FIG. 4, eight target text sub-segments have been identified and output, the first containing the German text "spezifischen Haushaltslinie" and the last containing the German text "spezifische". The translation system operator can then select one of the eight outputted target sub-segments 412 which corresponds to a desired translation of the portion of the source material being translated for insertion into a full translation of the source material. Alternatively, the translation system operator may continue to input text character-by-character.

In some embodiments according to the present technology, the target sub-segments which are outputted for review by the translation system operator may be ranked on the basis of an amount of elements (e.g. characters and/or words) in the respective target sub-segments. The sub-segments may then be outputted for review by the translation system operator on the basis of this rank.

Figure 4:
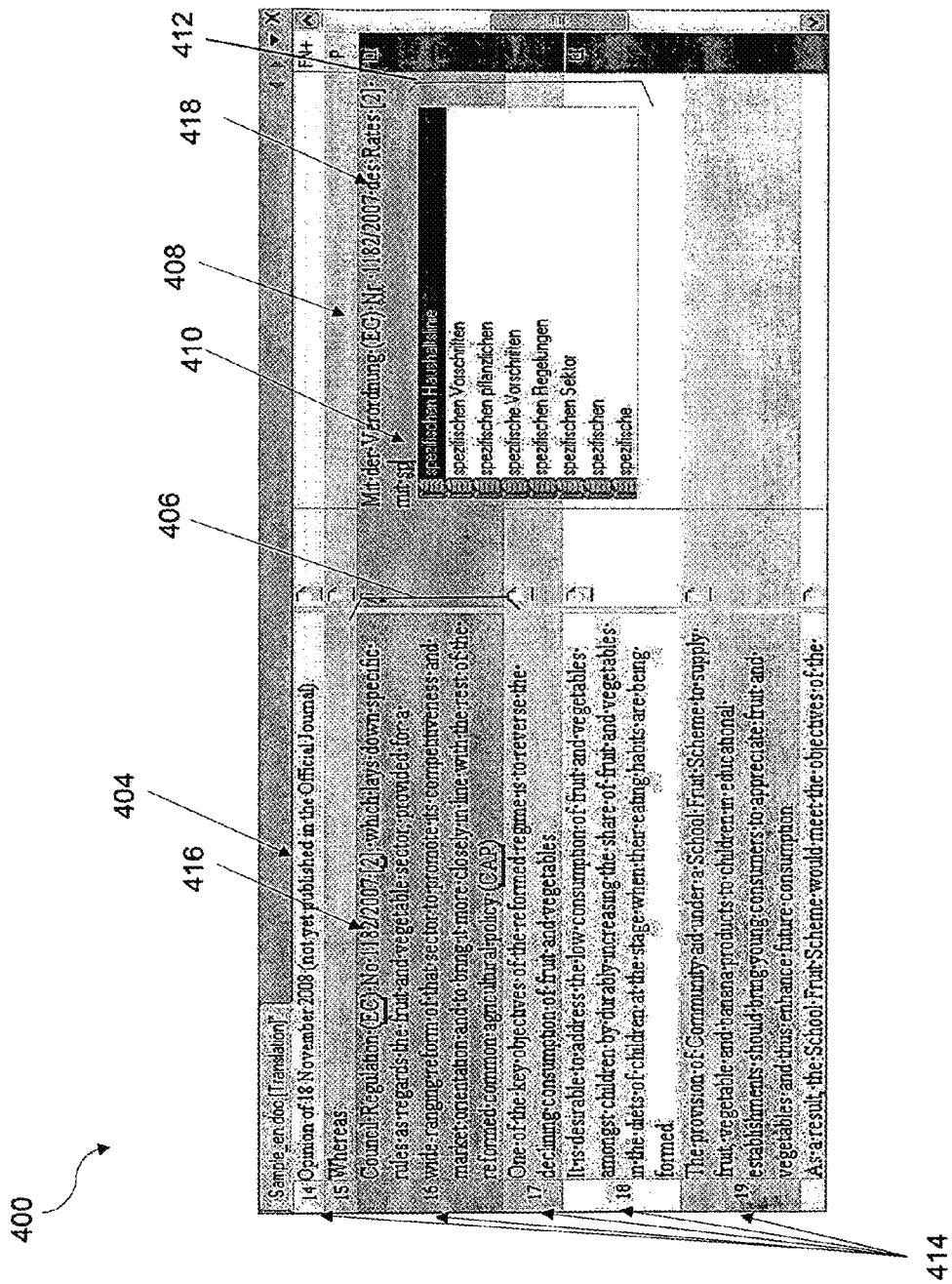
FIG. 4 is screenshot illustrating outputted target sub-segments according to embodiments of the present technology.

In the embodiment depicted in FIG. 4, each of the eight target text sub-segments 412 which have been outputted for review have been ranked on the basis of an amount of characters in the respective target sub-segments. In this case, the eight outputted target sub-segments, are ranked as follows:

1. "spezifischen Haushaltslinie"
2. "spezifischen Vorschriften"
3. "spezifischen pflanzlichen"
4. "spezifischen Vorschriften"
5. "spezifischen Regelugen"
6. "spezifischen Sektor"
7. "spezifischen"
8. "spezifische"

Therefore, the outputted target sub-segment "spezifischen Haushaltslinie" is ranked the highest as it is the longest identified translated sub-segment. Similarly, the target sub-segment "spezifische" is ranked the lowest as it is the shortest identified translated sub-segment.

In an alternative to ranking based on amount of elements (e.g. characters and/or words) in the respective target sub-segments, the target sub-segments which are outputted for review by the translation system operator may be ranked on the basis of an amount of elements (e.g. characters and/or words) in the respective source sub-segments to which the target sub-segments respectively correspond. As a general example of this type of ranking according to embodiments of the present technology, two bilingual sub-segment phrases may be provided which include the following sub-segment words in the source natural language: A, B, C, D, and the following sub-segment words in the target natural language: X, Y, Z. A first sub-segment phrase pair contains a source phrase comprising the words A, B, C and a corresponding target phrase comprising the words X, Y. A second sub-segment phrase pair contains a source phrase comprising the words A, B and a target phrase comprising the words X, Y, Z. When a source segment is provided which contains the words A B C D and the first data input from the translation system operator is X, the target sub-segment of the first sub-segment phrase pair is considered a better match and ranked higher in terms of a translation of the source material, since the source phrase A B C covers a longer part of the source (three word sub-segments in the source) as opposed to the second sub-segment phrase pair (two word sub-segments in the source).

The ranking of outputted target sub-segments according to the amount of target and/or source text corresponding thereto helps to increase the efficiency of a translation in that if the translation system operator selects the highest ranked (first outputted) target text sub-segment he is covering the largest portion of the target and/or source material. If the highest ranked target text sub-segment is selected each time by the translator during translation of a source material, the overall time spent in translating the source material will be reduced.

In addition to ranking, one or more of the identified and displayed target sub-segments may be identified as an initial best suggestion, and highlighted or otherwise emphasized in the list of suggestions output to the user. Highlighting of a target text-sub-segment also in this way is depicted in the screenshot of FIG. 4; in this case the highlighted target text sub-segment is "spezifischen Haushaltslinie". In the example shown in FIG. 4, insufficient characters have thus far been input in order to identify a unique best match—in this case other factors may be used to identify an initial suggestion to highlight. The identification of one of the outputted target text sub-segments 412 as the best match may be performed using various methods. In this example, a longest target sub-segment having initial characters matching the text input by the operator is selected as the initial suggestion. Where the number of characters entered by the operator is sufficient to uniquely identify a single sub-segment of target text, the target text sub-segment with the largest number of text characters in common with the first data input may be selected. Other factors may also be taken into account, such as for example frequency of use, and/or matching scores based on contextual analysis.

The translation system operator can thus be guided to the best match for their desired translation by the highlighting functionality and select the highlighted target text sub-segment for insertion into the translation of the source material with less effort than having to manually scan through each of the outputted target text sub-segments in order to arrive at the best match. Clearly, selecting the highlighted target text sub-segment is optional for the translation system operator, who may decide to insert one of the other non-highlighted target sub-segments into the translation of the source material instead.

Screenshot 500 of a Graphical User Interface (GUI) part of user input/output interface 104 shows the situation once the translation system operator has selected a particular target text sub-segment which is inserted into the translation 506 of source segment 406. In the embodiment depicted in FIG. 5, the selected target sub-segment 504 is the phrase "spezifischen Regelungen" which is shown to have been inserted into the translated text 506 as a translation of the English phrase "specific rules". The selection is carried out in the form of a second data input from the translation system operator, for example through a suitable keyboard or mouse selection via user input/output interface 104.

The translation process then continues in a similar manner for the translation of the remainder of source segment 406 and then on to subsequent source segments 414.

Figure 6:
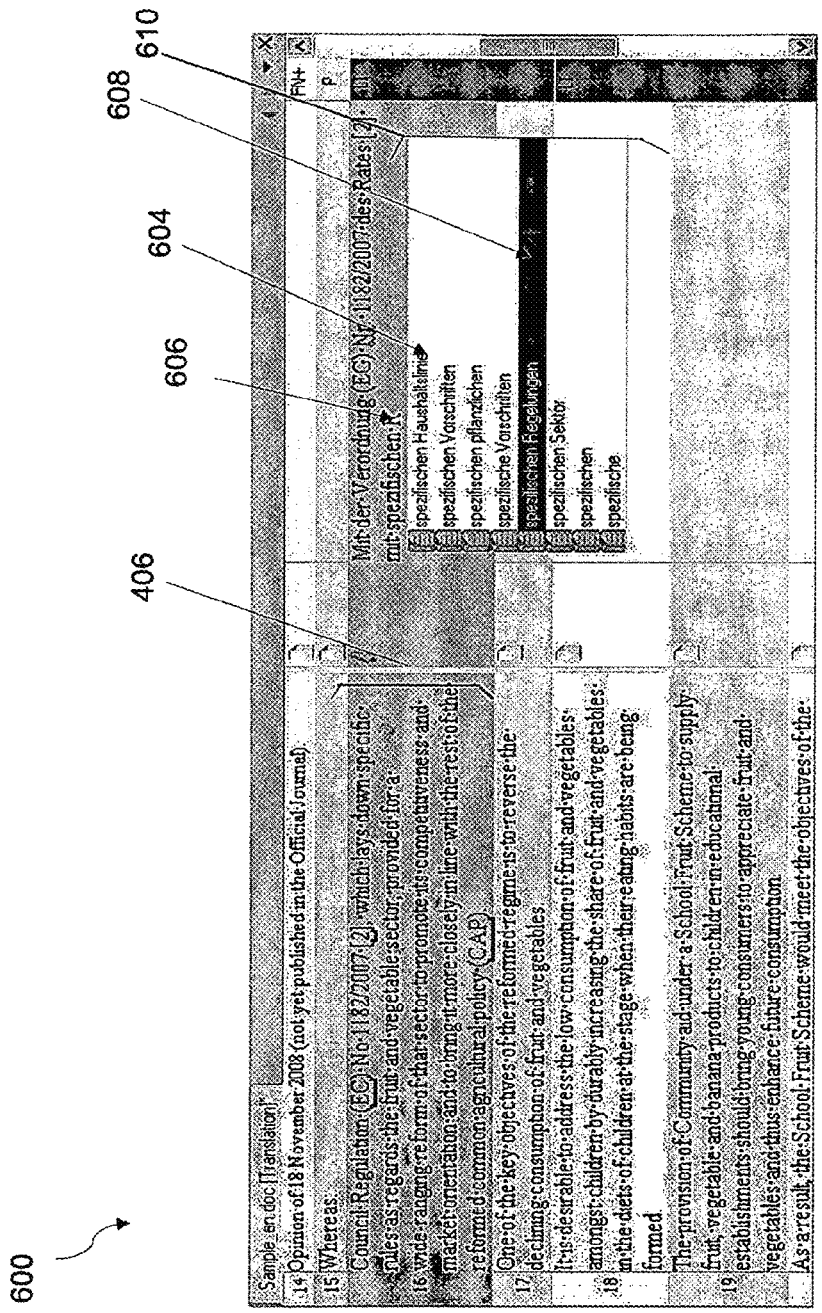
FIG. 6 is a screenshot showing highlighting of an outputted target sub-segment according to embodiments of the present technology.

FIG. 6 shows an example embodiment of the present technology, where screenshot 600 of a Graphical User Interface (GUI) part of user input/output interface 104 provides an example of a number of identified target sub-segments 610 being displayed, for review by a translation system operator. In the embodiment depicted in FIG. 6, the first data input 606 is a first portion of a translation, created and input by the operator character-by-character, of source sub-segment 406, in this case the text characters "spezifischen R" which are a number of text characters of the translation of the English words "specific rules" into German. In response to the first data input, eight target text sub-segments are identified and output for review by the translator, the first containing the German text "spezifischen Haushaltslinie" 604 and the last containing the German text "spezifische". In this embodiment, an identified best match, being one of the outputted target text sub-segments 608, is highlighted (or otherwise emphasized) in order to focus the attention of the translation system operator on target text sub-segment 608 identified as the initial best suggestion in particular.

In this example, the target text sub-segment with the largest number of text characters in common with the first data input is selected. In this case the first data input is the text characters "spezifischen R", so the target text sub-segment "spezifischen Regelungen" is highlighted, as shown in FIG. 6. Highlighted target text sub-segment 608 is therefore considered to be the best match to the part of the translation of the source material currently being input by the translation system operator from the target text sub-segments which have been identified and output.

In some embodiments according to the present technology, a first data input is received and as a result, a set of multiple target text sub-segments is identified from bilingual sub-segment list and outputted for review by the translation system operator. In the event that the translation system operator finds that the number of target sub-segments which are outputted on the basis of the first data input is too large to reasonably deal with, the human reviewer may add to the first data input by providing additional text characters as a further part of a human translation of the source material. The additional text characters form a third data input from the translator which are inputted via user input/output interface 104.

In response to the third data input, a subset of the initially outputted target text sub-segment is generated and output for review by the translation system operator. The subset has a smaller number of target text sub-segments than the set of target text sub-segments which were initially output for review. This can lead to increased translation efficiency as the translator will only have to read through a smaller number of suggested target text sub-segments before choosing an appropriate target text sub-segment to insert into the translation of the source material.

In the embodiment depicted in FIG. 4, after the translation system operator has input a first data input 410, the highlighting in the list of outputted target sub-segments emphasizes the first outputted target text sub-segment with the text "spezifischen Haushaltslinie". In the embodiment depicted in FIG. 6, after the translation system operator has input a third data input 606, the highlighting in the list of outputted target sub-segments 610 is updated from the previously highlighted target text sub-segment to emphasize the fifth outputted target text-sub-segment 610 with the text "spezifischen Regelungen". The fifth outputted target text-sub-segment 610 more closely corresponds to the combination of the first and third data inputs and ultimately, more closely matches the desired translation of source segment 406 currently being translated by the translator. In this way, the attention of the translation system operator may be immediately focused on a target sub-segment which will tend to be the most suitable in terms of the text characters the translation system operator is currently entering, rather than having to scan through the whole list of outputted target text sub-segments.

Figure 7A:
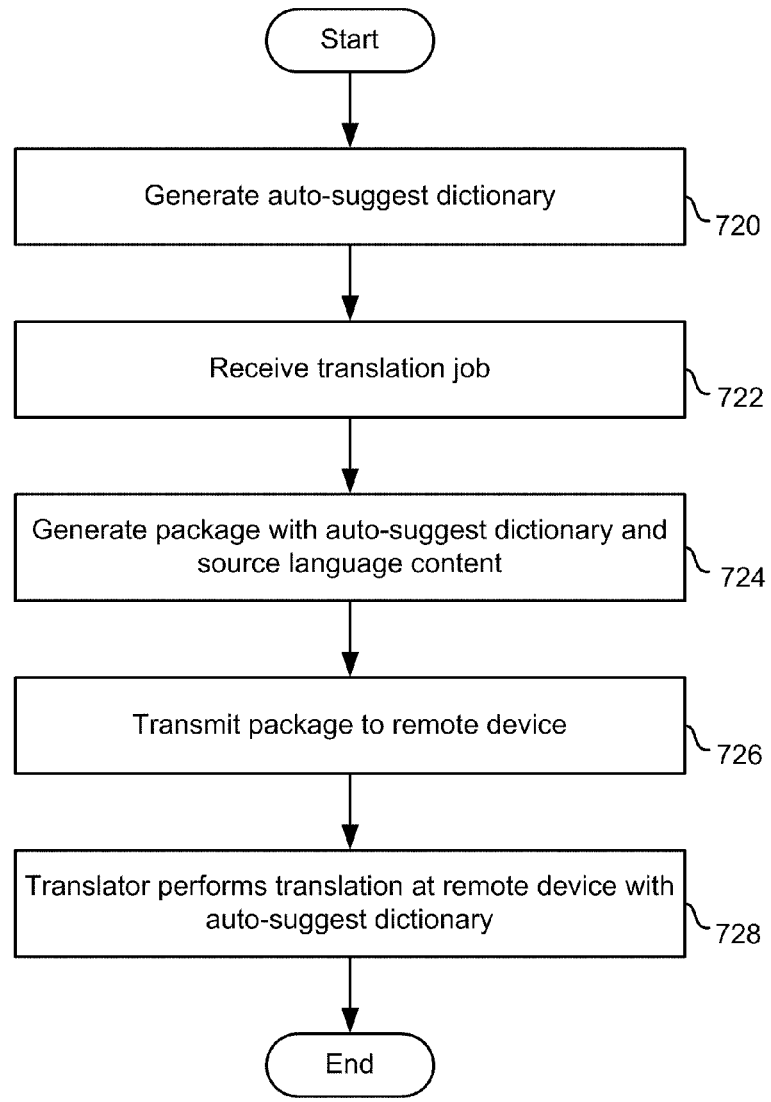
FIG. 7A is a flow diagram depicting an exemplary method for configuring an auto-suggest dictionary.

FIG. 7A is a flow diagram showing an exemplary method for configuring an auto-suggest dictionary. The method of FIG. 7A may be performed by server device 170. An auto-suggest dictionary (ASD) may be generated at step 720. The ASD may be generated by translation job management application 172, for example by a code such as a plug-in that is part of translation job management application 172. Generation of an ASD may include generating an initial ASD and updating an ASD. An ASD may be generated and updated based on translation units stored in a translation memory maintained in or accessible by server device 170. Updating an ASD is discussed in more detail with respect to the method of FIG. 7B.

A translation job may be received at step 722. The translation job may include content to be translated, parameters for the translation such as time limits, target language, requested translators, and other data which may be converted to meta-data for the translation by application 172.

A package may be generated at step 724. The package may include the ASD generated at step 720, the content in the source language, meta-data based on the received job parameters, and other data. The generated package may then be sent to the remote device at step 726. A translator may perform the translation through the remote device using the auto-suggest dictionary generated from the translation memory at the server at step 728.

Figure 7B:
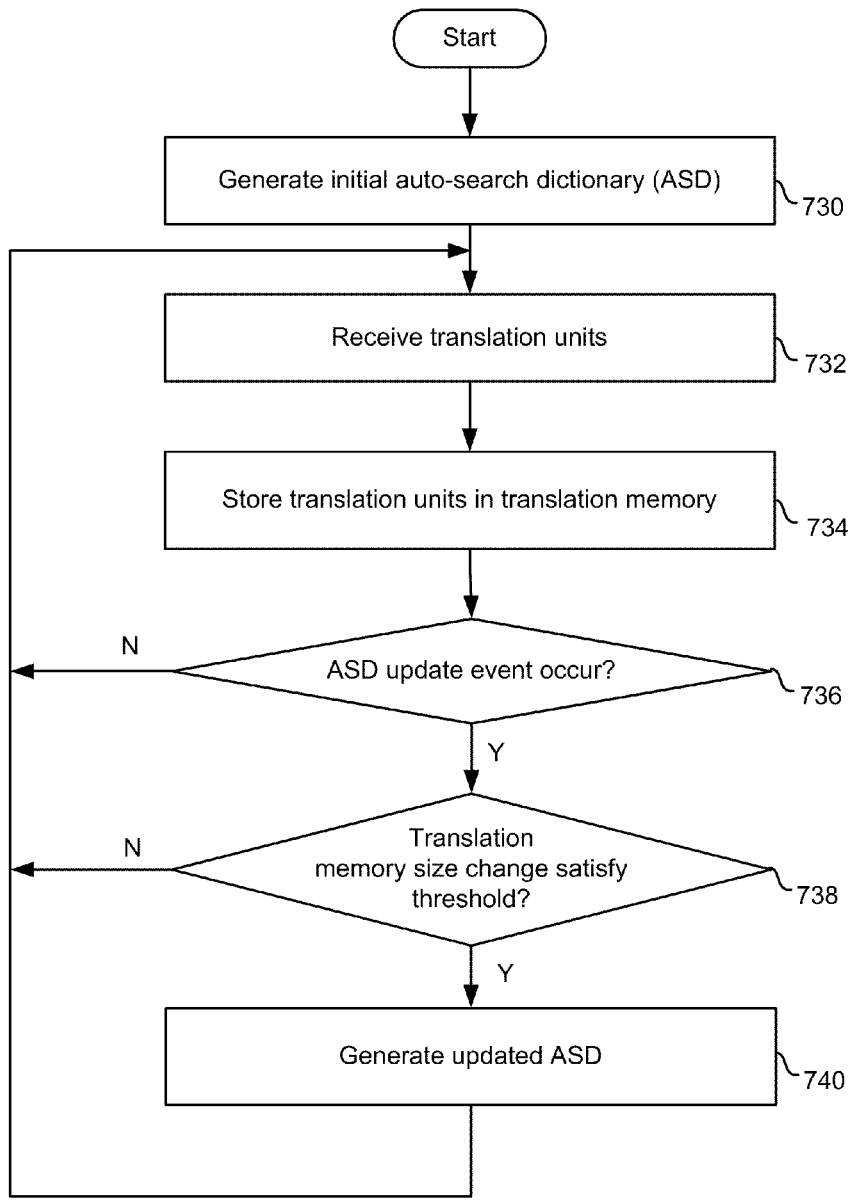
FIG. 7B is a flow diagram depicting an exemplary method for updating an auto-suggest dictionary.

FIG. 7B is a flow diagram showing an exemplary method for updating an auto-suggest dictionary and may be performed by server device 170. In some embodiments, the method of FIG. 7B may be performed separately for ASD data corresponding to source language-target language pair. An initial ASD may be generated at step 730. The initial ASD may be generated from translation units (sentence pairs consisting of a sentence in a source language and a translation of the sentence in the target language), such that segments of the source sentence and the corresponding translation of the segment are paired and stored with the ASD. Selecting a segment of a sentence is discussed in more detail herein.

As new translation jobs are performed by the present technology, new translation units may be received at step 732 and saved to translation memory within server device 170 at step 734. A determination is made as to whether an ADS update event occurs at step 736. In some embodiments, the ADS update event may be an expiration of a period of time, a change in the size of the translation memory that is greater or less than threshold, or some other event. When the event occurs or is detected, operation of the method of FIG. 7b continues to step 738. If no event occurs or is detected, the method returns to step 732.

A determination is made as to whether the translation memory size change satisfies a threshold at step 738. In some embodiments, a set of ASD data may be updated when the translation memory size for the particular source language-target language pair has increased by a minimum size or percentage. If the change in size satisfies a threshold, the ASD data is updated, or a new ASD is generated, at step 740 and the method of FIG. 7B returns to step 732. If the change in size does not satisfy a threshold, the method continues from step 738 to step 732.

Embodiments of the present technology will now be further described with reference to the flow diagrams of FIGS. 7C and 8 which each depict the steps involved in translating a source material according to embodiments of the present technology. The flow diagrams in FIGS. 7 and 8 illustrate methods 700, 800 respectively.

Figure 7C:
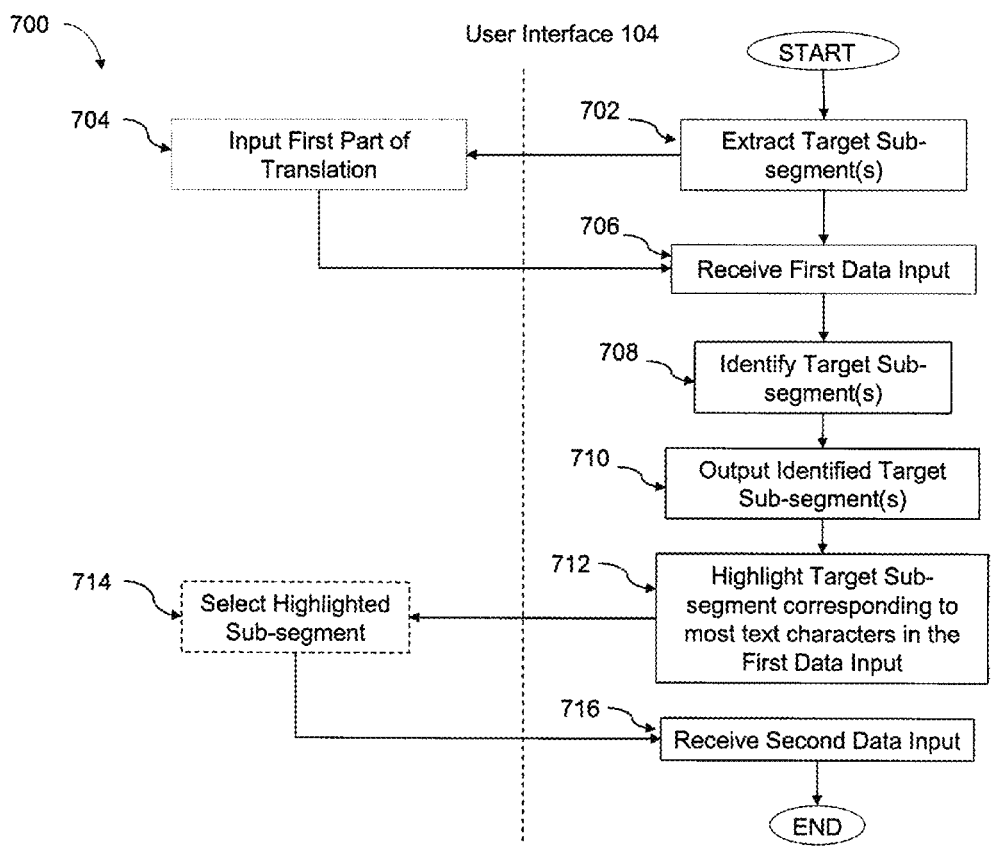
FIG. 7C is a flow diagram depicting machine-assisted natural language translation according to embodiments of the present technology.
Figure 8:
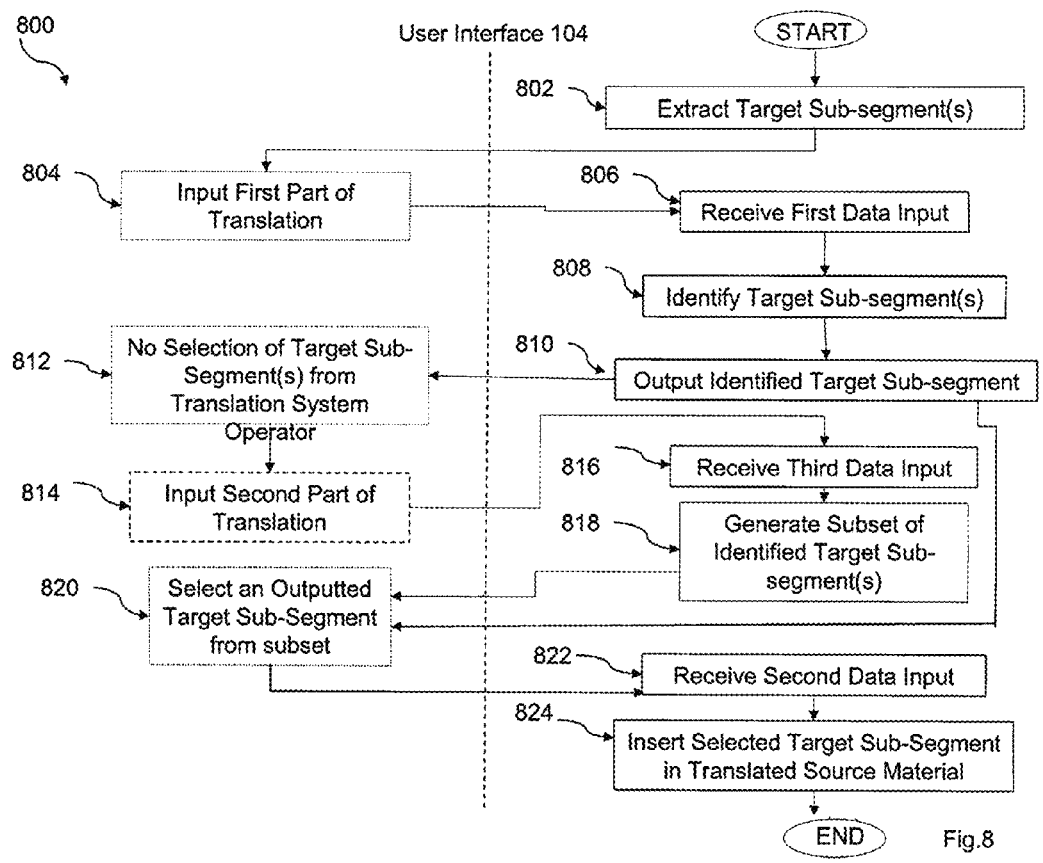
FIG. 8 is a flow diagram depicting machine-assisted natural language translation according to embodiments of the present technology.

FIGS. 7C and 8 illustrate methods which are performed on either side of user input/output interface 104 of computer system 102. The functional aspects provided towards the left of the diagram are performed by the translation system operator and the functional aspects provided towards the right of the diagram are performed the computer system 102. The steps depicted on either side of the diagram are performed separately from each other by human and machine respectively, but are shown on a single FIGURE to illustrate their interaction. Arrows between each side of the diagram do not illustrate a branch or split of the method but merely indicate the flow of information between the translation system operator and the computer system 102.

The translation process for the embodiment of the present technology depicted in FIG. 7C begins when at least one target text sub-segment 314 is extracted (e.g., by extraction process 310), at block 702, as described in more detail with reference to FIG. 3 above. Extraction process 310 would preferably be carried out offline in advance of the translation system operator beginning translation of the source material.

When the translation system operator begins translating the source material he inputs, at block 704, one or more text characters which form a first part of a human translation of the source material and a first data input is consequently received by computer system 102, at block 706. The first data input is then used, at block 708, to identify one or more target text sub-segments 314 (from the target text sub-segments extracted at block 702) in which the first text characters correspond to the first data input. The identified target text sub-segments are then output for review by the translation system operator in block 710. The target text sub-segment which has the most text characters matching the first data input is highlighted at block 712 in a manner as described above in relation to FIGS. 4 and 6.

In this example embodiment, the translation system operator selects, at block 714, the highlighted sub-segment and a second data input, corresponding to the target text sub-segment selection by the translation system operator, is consequently received, at block 716, and the selected sub-segment is inserted into the translation of the source material in a manner as described above in relation to FIG. 5.

The translation process for the embodiment of the present technology depicted in FIG. 8 begins when at least one target text sub-segment 314 is extracted (e.g., by extraction process 310), at block 802, as described in more detail with reference to FIG. 3 above. Extraction process 310 would preferably be carried out offline in advance of the translation system operator beginning translation of the source material.

When the translation system operator begins translating the source material he inputs, at block 804, one or more text characters which form a first part of a human translation of the source material and a first data input is consequently received by computer system 102, at block 806. The first data input is then used, at block 808, to identify one or more target text sub-segments 314 (from the target text sub-segments extracted at block 802) in which the first text characters correspond to the first data input. The identified target text sub-segments are then output for review by the translation system operator in block 810.

In this embodiment, the translation system operator does not select 812 any of the outputted target text sub-segments, but instead inputs, at block 814, a second part of the human translation in the form of one or more further text characters which form a second part of a human translation of the source material and a third data input is consequently received by computer system 102, at block 816. A subset of the previously outputted target text sub-segments 314 is then generated, at block 818, based on a combination of the first and third data inputs. It is to be appreciated that the third data input may be an updated or amended version of the first data input.

The translation system operator selects an outputted target sub-segment 314 for insertion into a translation of the source material, at block 820 and a second data input is consequently received by computer system 102, at block 822. The selected target sub-segment is inserted into the translated source material, at block 824, and displayed to the translation system operator.

In further embodiments of the present technology, the translation system operator can opt not to select the outputted target text segment in block 820, but instead to choose to input still further text characters. In this case, a further sub-sub-set of the previously identified target text sub-segments can be generated and output for review by the translation system operator. This process can be repeated until the translator chooses to select one of the outputted target text sub-segments for insertion into the translation of the source material.

In the following description of embodiments of the present technology, the term "source placeable element" is to be understood to include a date or time expression, a numeral or measurement expression, an acronym or any other such element in the source material which has a standard translation in the target natural language or any other element which is independent of the source or target language.

In embodiments of the present technology, computer system 102 connects to remote server 132 and retrieves placeable identification and conversion criteria 128. The placeable identification and conversion criteria 128 are then used to identify one or more source placeable elements in a source material and convert the identified source placeable element(s) into a form suitable for insertion into a translation of the source material in the target natural language. Source placeable elements do not require translation by a translation system operator, but can be converted automatically according to predetermined rules or criteria and inserted "as is" into the translation of the source material. This helps to increase the efficiency of the translation system operator as the translation system operator need not spend time dealing with them or translating them in any way.

An example of conversion of a source placeable element is depicted in the screenshot of FIG. 4. Here a source placeable element 416 is the number "1182/2007" which is identified as a number converted according to one or more predetermined rules for converting numbers and inserted into the translation of the source material as an identical number "1182/2007" as shown by item 418.

Another example of conversion of a source placeable element may involve conversion of a unit of measure such as an Imperial weight of 5 lb in the source material. If the target language is German, this Imperial weight will be converted in a metric weight according to the rule 1 lb=0.454 kg, resulting in the insertion of 2.27 kg in the translation of the source material.

Figure 9:
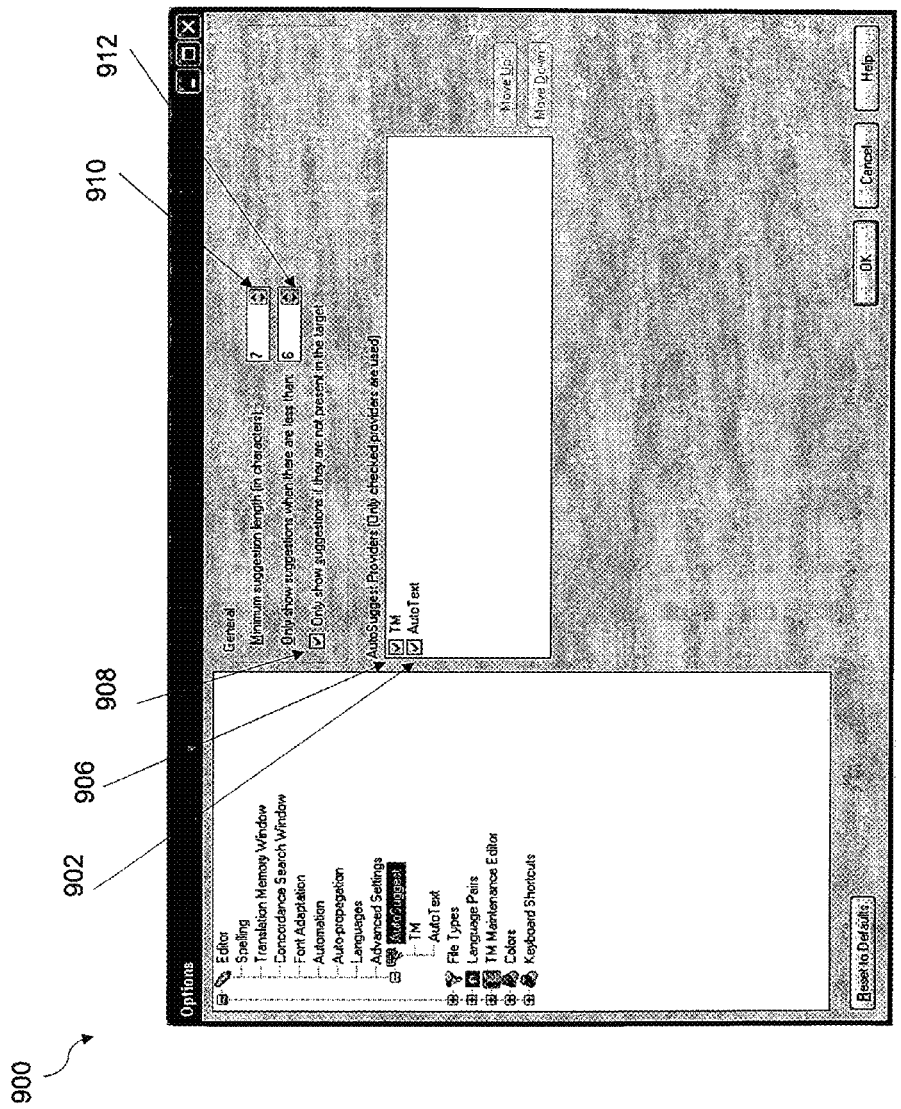
FIG. 9 is a screenshot illustrating configurable settings according to embodiments of the present technology.

FIG. 9 shows an example embodiment of the present technology, where screenshot 900 of a Graphical User Interface (GUI) part of user input/output interface 104 displays a number of configuration settings. Each of the settings may be initially set to a default setting and may be configured by the translation system operator by suitable input via user input/output interface 104.

GUI 900 illustrates one setting 910 for defining a minimum text character data input setting 910 which relates to the minimum amount of text characters in the first and/or third data inputs that the computer system 102 can receive before the identified target sub-segments 314 are output for review by the translation system operator. This setting can avoid the translation system operator having to read through outputted target text sub-segments having a low number of text characters, such as one or two letter words. In this particular case, this setting is set to 7 characters, so that only words or phrases with at least 7 text characters will be output for review by the translation system operator.

GUI 900 illustrates another setting 912 for defining the maximum number of target text sub-segments which are output for review by the translation system operator. This means no target text sub-segments will be output for review until a sufficiently small set of target sub-segments has been generated in response to the first and/or third data inputs from the translation system operator. This setting can avoid the translator having to read through a large number of target text sub-segments in order to find an appropriate target text sub-segment for insertion into the translation of a source material. In this particular case, this setting is set to six target sub-segments, so that only a maximum of six suggested target text sub-segments will be output for review by the translation system operator, i.e. only when the number of potentially matching sub-segments falls to six or below, will these suggestions be output for review.

GUI 900 illustrates further settings for only outputting suggested target sub-segments 314 which are not already present in the target material 908. With this setting enabled, target sub-segments 314 which have been selected by a translation system operator at a previous instance will not be output again for review by the translation system operator. This feature of the present technology helps to reduce the number of suggestions and hence avoids the user having to re-read already placed suggestions.

GUI 900 illustrates still further settings where the translation system operator can select the data to be referenced in the extraction of the target sub-segments 314, in this particular case translation memory 906 or AutoText database 902.

Figure 10:
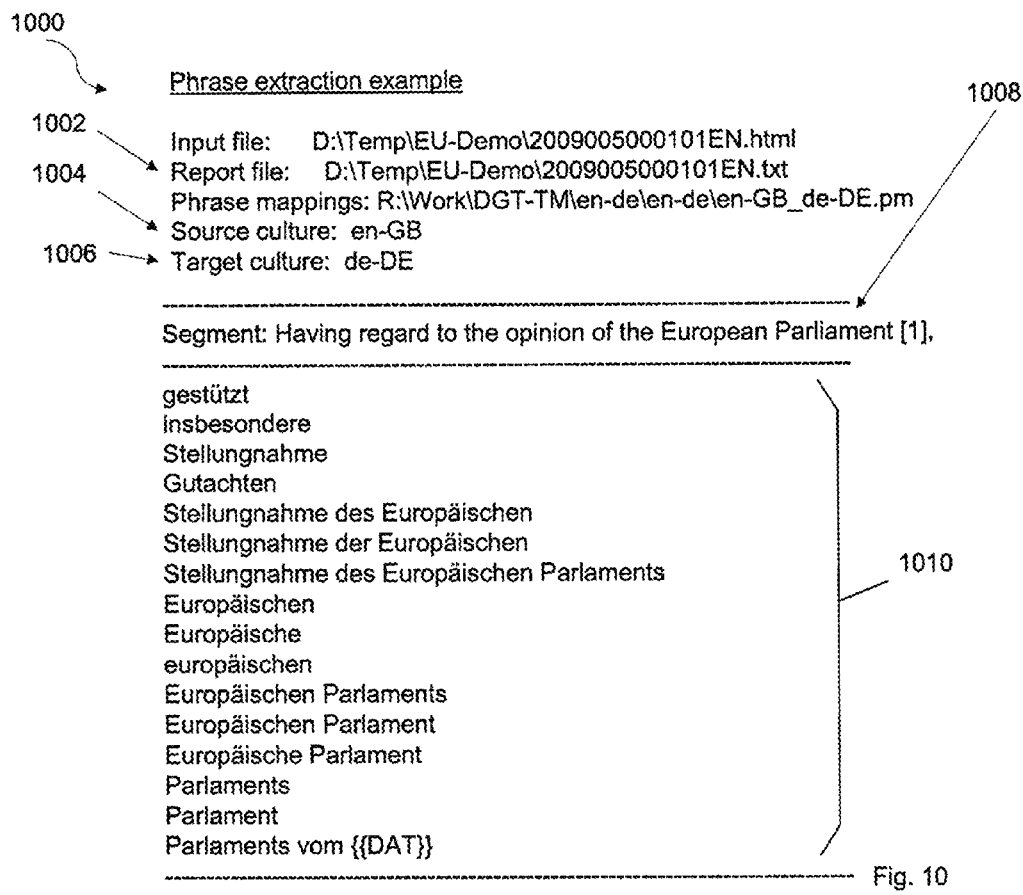
FIG. 10 is an illustrative example of a test file according to various embodiments of the present technology.

FIG. 10 shows an example embodiment of the present technology, where a test text file 1000 is generated by computer system 102 for use in demonstrating the results of an extraction process and assessing the accuracy of translation. In this embodiment of the present technology, test text file 1000 is written to a report file location 1002. The first natural language 1004 (GB English) and the second, target natural language are displayed 1006 (DE German). In addition, the source segment 1008 and a number of candidate target text sub-segments 1010 are displayed.

The above embodiments are to be understood as illustrative examples of the present technology. Further embodiments of the present technology are envisaged.

For example, the process described above for generating a subset of target text sub-segments when a translation system operator inputs a first data input followed by a third data input can also be reversed. If the translation system operator initially inputs a first data input and a first set of target text sub-segments are identified and displayed, then deletes one or more text characters, a super-set of target text sub-segments may be generated, i.e. a larger number of target text sub-segments than initially displayed, and output for review by the translation system operator. This might be useful if the translation system operator made a mistake with their initial data input for the translation or changes his mind as to how a part of the source material would best be displayed.

Embodiments of the present technology involving the generation of subsets or super-sets of target text sub-segments described above may be combined with embodiments of the present technology involving ranking of target text sub-segments and also or alternatively with embodiments of the present technology involving highlighting of target text sub-segments. In such embodiments, when a subset or super set is generated, ranking of the target text sub-segments and/or highlighting or the target text sub-segments may be updated when the target text sub-segments are output for review by the translation system operator.

Further embodiments of the present technology may involve computer analysis by an appropriate software process of the source material that is to be translated before the translation system operator begins translation of the source material. The software process may comprise parsing the source material to be translated in relation to a corpus of previously translated material and searching for correlations or other such relationships or correspondence between the source material and the previously translated material. As a result of the computer analysis, a list of target text sub-segments can be created by the software, the contents of which being potentially relevant to translation of the particular source material which is to be translated. When the translation system operator begins to translate the source material by entering one or more text characters, target text sub-segments can be identified from the list of potential target text sub-segments and output for review by the translation system operator. By taking the particular source material that is to be translated into account, the identified target text sub-segments may be more relevant and contain less noise terms, hence augmenting the efficiency of the translation process.

Still further embodiments of the present technology may also involve computer analysis of the source material that is to be translated, but instead of the computer analysis being performed in advance of the translation system operator beginning translation of the source material, the computer analysis is performed during translation of the source material by the translation system operator. In such embodiments, when the translation system operator enters in one or more text characters, a software process can be employed to identify target text sub-segments for suggestion to the translation system operator 'on-the-fly' with reference to both the input from the translation system operator and also to the source material to be translated. By taking the particular source material that is to be translated into account as well the input from the translation system operator, the identified target text sub-segments may be more relevant, in particular more relevant to the translation desired by the translation system operator.

In alternative embodiments, computer system 102 may operate as a stand-alone device without the need for communication with server 132. In terms of this alternative embodiment, formatting identification and conversion criteria and placeable identification and conversion criteria will be stored locally to the computer system. In other embodiments, the main processing functions of the present technology may instead be carried out by server 132 with computer system 102 being a relatively 'dumb' client computer system. The functional components of the present technology may be consolidated into a single device or distributed across a plurality of devices.

In the above description and accompanying figures, candidate target text sub-segments for suggestion to the translation system operator are extracted from a bilingual corpus of previously translated text segment pairs in a source natural language and a target natural language. In other arrangements of the present technology, a multilingual corpus could be employed containing corresponding translated text in other languages in addition to the source and target natural languages.

While the machine-readable medium is shown in an example embodiment to be a single medium, the term machine-readable term should be taken to include a single medium or multiple media (e.g., a centralized or distributed database, and/or associated caches and servers) that store the one or more sets of instructions. The term "machine-readable medium" shall also be taken to include a medium that is capable of storing, encoding or carrying a set of instructions for execution by the machine and that cause the machine to perform any one or more of the methodologies of the example embodiments, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present technology, which is defined in the accompanying claims.

What is claimed is:

1. A non-transitory computer readable storage medium having embodied thereon a program, the program being executable by a processor to perform a method for translating content, the method comprising:
   extracting auto-suggest dictionary data including a plurality of sentence sub-segment pairs, each pair comprising a source sentence sub-segment extracted from a source sentence in a source language and a target sentence sub-segment extracted from a translation of the source sentence in a target language, the source and target sentences stored in translation data;
   generating a package including translation content and the extracted auto-suggest dictionary data;
   transmitting the package from a server to a remote device configured to:
      display a plurality of target sentence sub-segments as predictive translations based on correspondence between data input to the remote device by a human translator and at least a portion of the target sentence sub-segments,
      highlight a suggested best predictive translation in the plurality of predictive translations,
      receive a selection of one of the plurality of predictive translations from the human translator, and
      provide the received selection to the server; and
   updating the extracted auto-suggest dictionary data based on the received selection.

2. The non-transitory computer readable storage medium of claim 1, the method further comprising storing parameters for the translation in the form of meta-data in the package.

3. The non-transitory computer readable storage medium of claim 1, wherein the auto-suggest dictionary data is configured to be accessed by a translation application on the remote device.

4. The non-transitory computer readable storage medium of claim 1, the method further comprising providing the updated auto-suggest dictionary data to a second remote device.

5. The non-transitory computer readable storage medium of claim 1, the method further comprising updating an auto-suggest dictionary stored in the package based at least in part on detection of an auto-suggest dictionary update event.

6. The non-transitory computer readable storage medium of claim 1, the method further comprising updating the auto-suggest dictionary data stored in the package based on a change in size of the auto-suggest dictionary data.

7. A method comprising:
   generating auto-suggest dictionary data including a plurality of sub-segment pairs, each sub-segment pair including a source sub-segment in a source language and a target sub-segment corresponding to a translation of the source sub-segment into a target language, each sub-segment pair extracted from a stored translation unit including a source segment and a corresponding target segment corresponding to a translation of the source segment;
   combining translation units, content to be translated, and the plurality of sub-segment pairs in a translation package;
   transmitting the translation package from a server to a remote device configured to:
      access the translation package,
      present content in the package to a human translator, receive data input in the target language from the human translator, display a plurality of predictive translations to the human translator in response to the received data input, each predictive translation being a translation of a source sub-segment from the source language to a corresponding target sub-segment of the target language in the package, each predictive translation based on correspondence between the data input from the human translator and at least a portion of the target sub-segment in the package, rank the predictive translations based on an amount of displayed elements, indicate a best predictive translation based on a number of text characters in the predictive translation in common with the data input, and receive a selection of the one of the ranked plurality of predictive translations from the human translator;

receiving new translation units from the remote device, the new translation units based on selections of the predictive translations by the human translator;

updating the auto-suggest dictionary data based on the received new translation units; and storing the updated auto-suggest dictionary in the package.

8. The method of claim 7, wherein the package further includes metadata for the translation project, placeable identification, and conversion data.

9. The method of claim 7, wherein updating the auto-suggest dictionary is triggered by a change in size of the translation memory greater than a threshold over an interval of time.

10. The method of claim 7, the method further comprising:
updating the auto-suggest dictionary data; and
providing the updated auto-suggest dictionary data to a second remote device.

11. The method of claim 7, the method further comprising updating an auto-suggest dictionary based at least in part on detection of an auto-suggest dictionary update event.

12. The method of claim 7, the method further comprising updating the auto-suggest dictionary data based on a change in size of the auto-suggest dictionary data.

13. A system for managing translation of content, the system comprising:
a memory;
a dictionary generation module stored in the memory and executable by a processor to extract auto-suggest dictionary data comprising source sentence sub-segments and corresponding target sentence sub-segments from stored translation data including source sentence segments and corresponding translated target sentence segments;
a translation module to display a plurality of predictive translations to a human translator, each predictive translation received as a target sentence sub-segment from the auto-suggest dictionary data based on correspondence between data input by the human translator and at least a portion of the received target sentence sub-segment;
a ranking module to rank the plurality of displayed predictive translations;
an input/output module to receive a selection from the human translator of a predictive translation from the plurality of ranked predictive translations; and a package management module stored in the memory and executable by the processor to:
generate a package including content to be translated, the extracted auto-suggest dictionary data which corresponds to the source language and target language for the translation job to be performed, parameters for translation in the form of metadata, and placeable identification and conversion data,
provide the generated package to the translation module, and
update the auto-suggest dictionary data in the package based on the received selection.

14. The system of claim 13, the dictionary generation module configured to generate second auto-suggest dictionary data based on updated stored translation data.

15. The non-transitory computer readable storage medium of claim 1, wherein the predictive translations provided from the auto-suggest dictionary data are further based on correspondence between the content being translated by the human translator and the sentence segment in the source language.

16. The non-transitory computer readable storage medium of claim 1, wherein a predictive translation of the plurality of predictive translations is highlighted based on an amount of correspondence between the data input by the human translator and the plurality of predictive translations, and the plurality of predictive translations are ranked based on ranking factors, the ranking factors comprising:
a likelihood of selection by the human translator; and
a length of one of the predictive translations.

17. The method of claim 7, wherein the predictive translations provided from the auto-suggest dictionary data are further based on correspondence between the content being translated by the human translator and the sentence segment in the source language.

18. The method of claim 7, wherein the plurality of predictive translations are ranked based on ranking factors and a predictive translation is highlighted based on an amount of correspondence between the data input by the human translator and the plurality of predictive translations, the ranking factors comprising:
a likelihood of selection by the human translator; and
a length of one of the predictive translations.

19. The system of claim 13, wherein the predictive translations provided from the auto-suggest dictionary data are further based on correspondence between the content being translated by the human translator and the source sentence segments.

20. The system of claim 13, wherein the plurality of predictive translations are ranked based on ranking factors, the ranking factors comprising:
a likelihood of selection by the human translator;
an amount of words in the source sub-segments to which words in the respective predictive translations correspond; and
a length of one of the predictive translations.

21. The non-transitory computer readable storage medium of claim 1, wherein the stored translation data comprises translated text in a plurality of target languages.

22. The non-transitory computer readable storage medium of claim 1, further comprising determining a highest ranked predictive translation, wherein the highest ranked predictive translation is visually emphasized.

* * * * *